(12) United States Patent
Okuchi et al.

(10) Patent No.: US 6,193,398 B1
(45) Date of Patent: Feb. 27, 2001

(54) SYSTEM FOR AUTOMATICALLY ADJUSTING OPTICAL AXIS DIRECTION OF VEHICLE HEADLIGHT

(75) Inventors: Hiroaki Okuchi, Anjo; Kenichi Nishimura, Gifu, both of (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/333,686

(22) Filed: Jun. 16, 1999

(30) Foreign Application Priority Data

| Jun. 16, 1998 | (JP) | 10-167626 |
| Aug. 31, 1998 | (JP) | 10-244782 |
| Apr. 15, 1999 | (JP) | 11-107851 |
| Apr. 15, 1999 | (JP) | 11-107852 |
| Apr. 15, 1999 | (JP) | 11-107853 |

(51) Int. Cl.[7] ................................. G01B 13/18
(52) U.S. Cl. .................. 362/466; 362/460; 362/464; 362/465; 362/37; 362/276
(58) Field of Search .................... 362/460, 464, 362/465, 466, 37, 276

(56) References Cited

U.S. PATENT DOCUMENTS

| 4,973,155 | * | 11/1990 | Masuda | 356/121 |
| 5,195,816 | * | 3/1993 | Moss et al. | 362/465 |
| 5,877,680 | * | 3/1999 | Okuchi et al. | 340/468 |
| 6,010,237 | * | 1/2000 | Gotou | 362/460 |
| 6,049,749 | * | 4/2000 | Kobayashi | 701/49 |
| 6,109,759 | * | 8/2000 | Tanabe et al. | 362/42 |

FOREIGN PATENT DOCUMENTS

| 9-290683 | 11/1997 | (JP) | B60Q/1/08 |
| 9-301055 | 11/1997 | (JP) | B60Q/1/12 |

* cited by examiner

*Primary Examiner*—Sandra O'Shea
*Assistant Examiner*—Ali Alavi
(74) *Attorney, Agent, or Firm*—Pillsbury Winthrop LLP

(57) ABSTRACT

In a vehicle headlight optical axis automatic adjusting system, a pitch angle in the longitudinal direction of a vehicle is calculated from a signal of a height sensor. Filtering corresponding to a control mode according to the acceleration is fixed and is not frequently switched unless the constant speed state of the vehicle continues for a predetermined time. The pitch angle may be calculated on the basis of the vehicle rear height value by using a prediction expression which is divided into a plurality of regions of vehicle postures according to loading conditions of an occupant load and a trunk load in correspondence with the vehicle type. The pitch angle may be updated when the vehicle enters a constant speed driving mode, i.e., stable driving mode, so that even when one trip is not finished the error is cancelled.

9 Claims, 18 Drawing Sheets

SYSTEM FOR AUTOMATICALLY ADJUSTING OPTICAL AXIS DIRECTION OF VEHICLE HEADLIGHT

CROSS REFERENCE TO RELATED APPLICATION

This application relates to and incorporates herein by reference Japanese Patent Applications No. 10-167626, No. 10-244782, No. 11-107851, No. 11-107852 and 11-107853 filed on Jun. 16, 1998, Aug. 31, 1998, Apr. 15, 1999, Apr. 15, 1999 and Apr. 19, 1999, respectively.

BACKGROUND OF THE INVENTION

1. Field of the Invention

The present invention relates to a vehicle headlight optical axis direction adjusting system for automatically adjusting the optical axis direction of irradiation of a headlight provided for a vehicle.

2. Description of Related Art

Conventionally, in the headlight of a vehicle, when the optical axis of the a headlight is directed upward due to inclination of the chassis of the vehicle, glare is given to an on-coming vehicle or the like. When the optical axis is directed downward, a driver of the vehicle may lose the far field of view. There has been, consequently, a demand for holding the optical axis direction of the headlight unchanges as much as possible.

JP-A-9-301055 discloses a vehicle headlight optical axis control system, in which a control mode is set in accordance with acceleration, a filtering process is executed when the acceleration is smaller than a predetermined value, the filtering process is not performed so as not to delay switching of the control mode when the acceleration is equal to or larger than the predetermined value, and the optical axis direction of the headlight is adjusted on the basis of a change in the height of the vehicle on each occasion.

In the above system, when the acceleration of the level which can not be reached in a normal driving state is sensed in association with a known traction (TRC) control or antilock brake (ABS) control, since the acceleration is equal to or larger than the predetermined value, the filtering process is not performed and the control mode is frequently switched. At the time of acceleration associated with the TRC control (TRC control time) or at the time of deceleration associated with the ABS control (ABS control time), although the acceleration largely changes, the vehicle posture does not change so much. As a result, the optical axis is improperly controlled when the direction of the optical axis of the headlight is allowed to follow changes in the acceleration at such time.

Another optical axis control system is known which uses an inclination angle obtained by approximating an amount of change in the vehicle posture caused by loading to a linear expression. According to this control, the optical axis direction of the headlight can be made to coincide with the vehicle posture under a limited loading condition such as "only occupant load" or "occupant load and up to 50 kg of trunk load". However, various loading conditions of combination of the occupant load and the trunk load can not be dealt with.

In a still another system, a vehicle height sensor is installed only on either the right or left side of a rear wheel since front wheels are wheels to be steered and an installation space is limited. A front height value is estimated on the basis of a rear height value in the stop mode of the vehicle to calculate the inclination angle. When the vehicle is stopped riding on a block or the like, a rear height value different from that on a flat road is sensed. In one trip (a driving interval between stops of the vehicle) after that, there is consequently an inconvenience such that a computation error occurs in the inclination angle in the longitudinal direction of the vehicle and the optical axis direction of the headlight is deviated. Since the rear height value changes due to turning which is a rotary motion around the longitudinal axis of the vehicle during a turn although the vehicle is not inclined in the longitudinal direction, a computation error occurs in the inclination angle in the longitudinal direction of the vehicle until the turn of the vehicle is finished and there is an inconvenience such that the optical axis direction of the headlight is accordingly deviated.

SUMMARY OF THE INVENTION

The present invention has an object to properly adjust the optical axis direction of a headlight in accordance with a driving state of a vehicle without frequently switching the optical axis direction of the headlight.

The present invention has another object to deal with various loading conditions in the event of automatically adjusting the optical axis direction of a headlight of a vehicle on the basis of an output of a single vehicle height sensor.

The present invention has a further object to properly correct a deviation in optical axis direction of a headlight when the vehicle is either stopped riding on a block or the like or is in a turn state.

According to one aspect of the present invention, an inclination angle in the optical axis direction of a headlight of a vehicle to the horizontal plane is calculated on the basis of output values from two vehicle height sensors arranged on the front and rear sides of the vehicle, respectively. A filter for changing the response of adjustment of the optical axis direction of the headlight is switched depending on a control mode determined in correspondence with a vehicle speed and acceleration. When the acceleration exceeds the highest determination level which is set so as not to be reached in a normal driving state, the control mode corresponding to the acceleration state or the deceleration state of the vehicle is continued unless a constant speed state of the vehicle continues for a predetermined period after that.

According to another aspect of the present invention, inclination angle in an optical axis direction of a headlight to the horizontal plane is calculated on the basis of an output value from a single vehicle height sensor by using a prediction expression which is divided into a plurality of regions of vehicle postures having different inclinations in accordance with loading conditions of an occupant load and a trunk load. The optical axis direction of the headlight is adjusted on the basis of the inclination angle. For example, by preparing the prediction expression divided into a plurality of regions of vehicle postures in accordance with the loading conditions of the occupant load and the trunk load in correspondence with the vehicle type and the like. Preferably, the inclination angle is calculated from both of the output of the single vehicle height sensor and an error which occurs in association with installation of the vehicle height sensor.

According to a further aspect of the invention, when it is determined that a driving mode of a vehicle is a stable driving mode, a reference inclination angle in the vehicle stop mode is updated based on an output of a vehicle height sensor, the inclination angle in the driving mode is corrected on the basis of the reference angle, and the optical axis direction of the headlight is thereby adjusted. When the vehicle once enters the constant speed driving mode before completion of one trip, irrespective of the presence or absence of a deviation in the optical axis direction of the headlight of the vehicle, the reference inclination angle in the vehicle stop mode is updated and the inclination angle in the driving mode is corrected. Thus, an effect such that even if the optical axis direction of the headlight is deviated, it can be properly adjusted is obtained.

DETAILED DESCRIPTION OF THE PREFERRED EMBODIMENT

Figure 1:
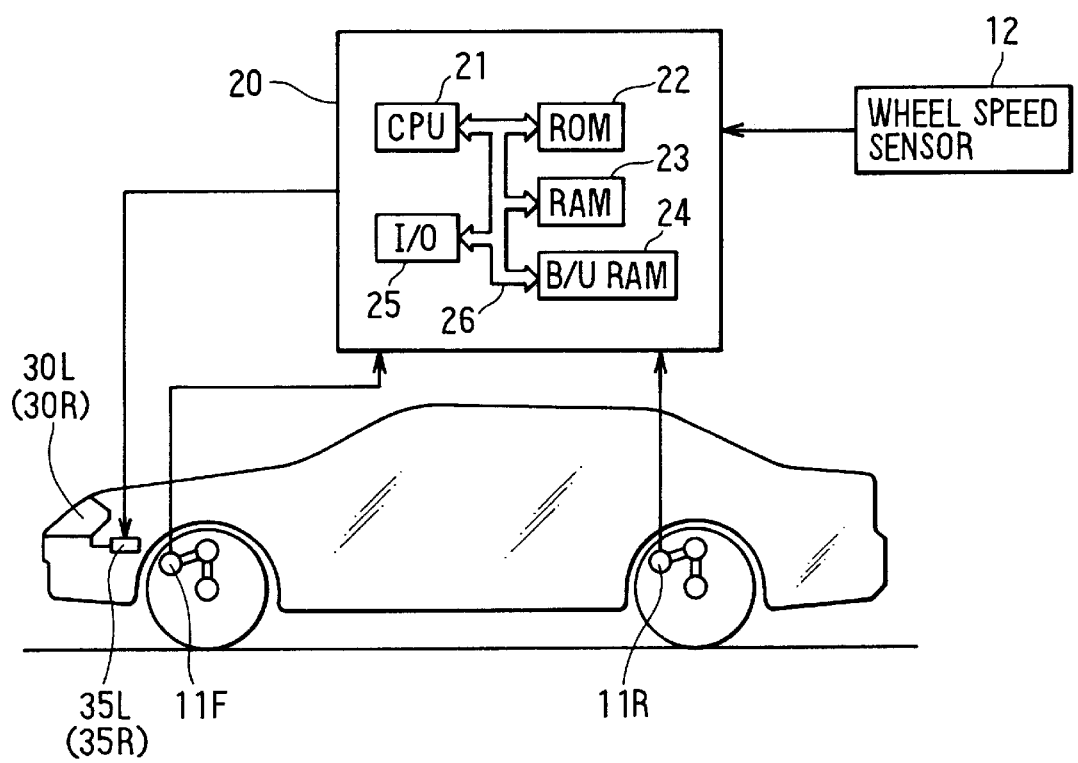
FIG. 1 is a schematic diagram showing a vehicle headlight optical axis direction automatic adjusting system according to a first embodiment of the invention.

The present invention will be described in detail with reference to various embodiments, in which the same or similar reference numerals designate the same or similar parts and steps.

First Embodiment

Referring first to FIG. 1, a front (front-wheel) height sensor 11F is attached to a front suspension provided between a front axle and a vehicle chassis on a driver's seat side or a front passenger seat side. A rear (rear-wheel) height sensor 11R is attached to a rear suspension provided between the rear axle and the vehicle chassis on the driver's seat side or the rear passenger seat side. A front height value (a displacement of the vehicle height on the front wheel side) HF and a rear height value (a displacement of the vehicle height on the rear wheel side) HR as relative displacements (displacements of the vehicle height) between the respective axles on the front and rear wheel sides and the vehicle chassis supplied from the height sensors 11F and 11R, and various sensor signals of wheel speed pulses and the like from a wheel speed sensor 12 which is mounted as a vehicle speed sensor on the vehicle side and is used for known TRC and ABS controls and the like are supplied to an ECU (Electronic Control Unit) 20. For convenience, the ECU 20 and the wheel speed sensor 12 are illustrated outside of the vehicle.

The ECU 20 is a logical operating circuit comprising a CPU 21 as a known central processing unit, a ROM 22 in which control programs are stored, a RAM 23 for storing various data, a B/U (back-up) RAM 24, an input/output circuit 25, and a bus line 26 connecting these elements.

Output signals from the ECU 20 are supplied to actuators 35R and 35L of right and left headlights 30R and 30L of the vehicle, thereby adjusting the optical axis direction of the right and left headlights 30R and 30L as will be described hereinlater. The various sensor signals from the wheel speed sensor 12 and the like are used for determining the mode of the vehicle, such as stop mode, acceleration mode, deceleration mode, and constant speed mode.

Figure 2:
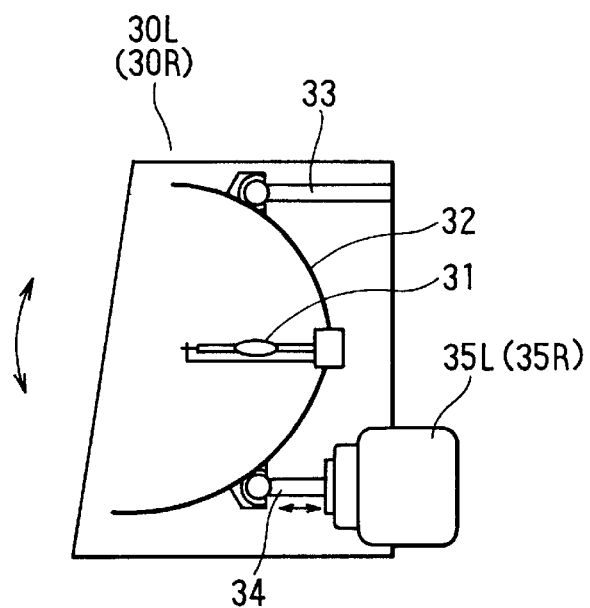
FIG. 2 is a cross section showing a headlight used in the first embodiment.

As shown in FIG. 2, the headlight 30L (30R) includes a lamp 31, a reflector 32 for fixing the lamp 31, a supporting member 33 of a rod shape for supporting the reflector 32 swingably in the directions shown by the arc arrow, a movable member 34 having also a rod shape, for supporting the reflector 32, and the actuator 35L (35R) such as a stepping motor or a DC motor for driving the movable member 34 in the directions shown by the double-headed arrow. The movable member 34 is driven in the back and forth directions by the actuator 35L (35R) so that the reflector 32 is vertically inclined about the end of the supporting member 33 as a fulcrum only by an actuator driving angle (target optical axis direction adjusting angle) θa which will be described hereinlater, thereby adjusting the optical axis direction of the headlight 30L (30R). The optical axis direction of the headlight 30L (30R) is initially set on the assumption that one driver is on the vehicle.

The pitch angle θp[°] as an inclination angle in the longitudinal direction of the vehicle to a preset reference plane is calculated by the following equation on the basis of the front height value HF and the rear height value HR sent from the height sensors 11F and 11R among the various sensor signals of the vehicle supplied to the ECU 20. Lw denotes a wheel base (distance between the axles) between the front and rear wheels.

$$\theta p = \tan^{-1}\{(HF-HR)/Lw\}$$

Figure 3:
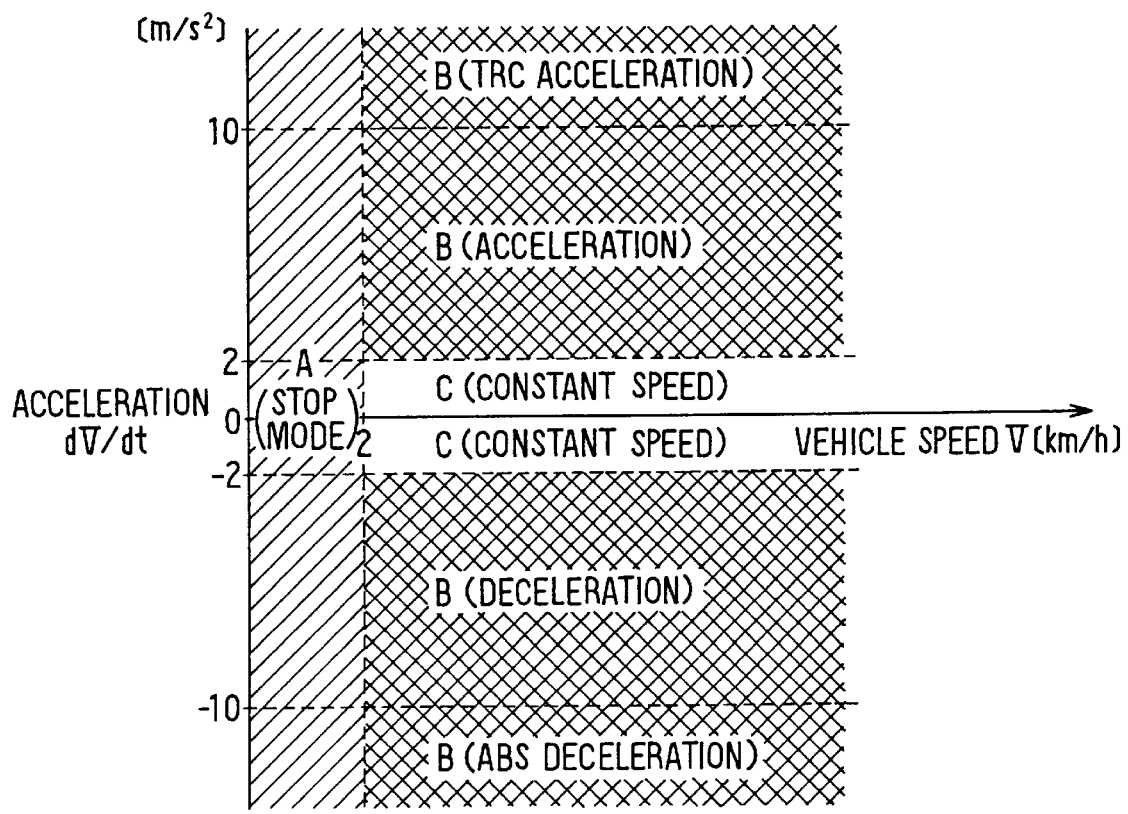
FIG. 3 is a diagram showing filter regions corresponding to control modes in the first embodiment.

In FIG. 3, the filter regions A, B, and C are illustrated that correspond to the control modes of the vehicle (stop mode, acceleration mode, TRC acceleration mode, ABS deceleration mode, deceleration mode, constant speed mode) when the abscissa denotes vehicle speed V [km/h] and the ordinate indicates acceleration dV/dt [m/s$^2$] obtained by differentiating the vehicle speed V. The filters are realized by either hardware for the height sensor signal (for example, smoothing of a signal by a CR circuit) or software for the height sensor signal or the pitch angle (for example, smoothing of a signal by the ECU by using moving average or standard deviation). The system uses the moving average for the pitch angle, which is advantageous from the viewpoint of cost since the ECU is originally provided therein.

In the diagram of FIG. 3, the filter A corresponding to the stop mode is used when the vehicle speed V is lower than a few km/h (for example, 2 [km/h]). When the vehicle is stopped, a large change in the pitch angle due to loading, unloading, or the like is expected. No filtering or very weak filtering is therefore performed so that the actuator is allowed to respond quickly to the change in the pitch angle.

On the other hand, when the vehicle speed v is equal to or larger than a few km/h (for example, 2 [km/h]) and the acceleration dV/dt obtained by differentiating the vehicle speed V exceeds a preset threshold (such as ±2 [m/s$^2$]), the filter B corresponding to the acceleration mode or the deceleration mode is used. Since the change in the pitch angle is large, no filtering or very weak filtering is performed so that the actuator is allowed to respond quickly to the change in the pitch angle.

In this embodiment, as will be described hereinlater, when the speed V of the vehicle is equal to or higher than a few km/h (such as 2 [km/h]) and the acceleration dv/dt obtained by differentiating the vehicle speed V exceeds a threshold (for example, ±2 [m/s$^2$]) for determining the acceleration mode or the deceleration mode and further once exceeds a preset threshold (for example ±10 [m/s$^2$]) which can not be reached in the normal driving state, unless the constant speed driving state of the vehicle continues for a predetermined period (for instance, 0.5 [sec]) after that, the TRC acceleration mode at the time of the TRC control or the ABS deceleration mode at the time of the ABS control is determined and the filtering B which is also used in the acceleration or deceleration mode is continuously performed.

When the vehicle speed V is equal to or higher than a few km/h (such as 2 [km/h]) and the acceleration dV/dt obtained by differentiating the vehicle speed V is lower than the preset threshold (for example, ±2 [m/s$^2$]), the filter C corresponding to the constant speed mode is used. Since it is generally expected that the pitch angle does not largely change, strong filtering is performed so as to remove high frequency components of a vibration at the time of driving and the change in the pitch angle due to unevenness of the road surface, thereby preventing the actuator from responding.

The optical axis control routine is repetitively executed every 50 ms or so by the CPU 21.

Figure 4:
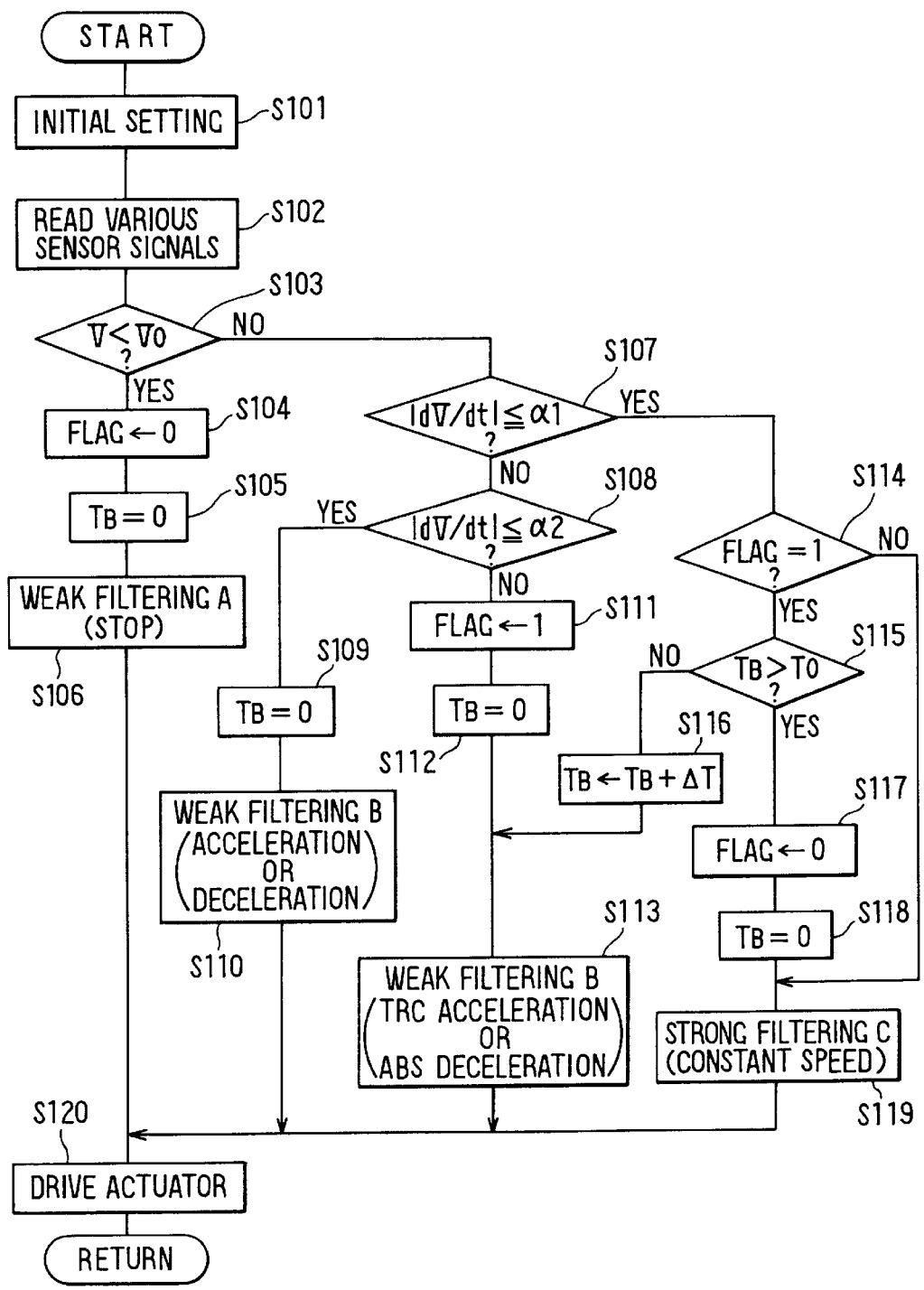
FIG. 4 is a flow diagram showing an optical axis control in the first embodiment.

As shown in FIG. 4, initial setting is executed at step S101. After that, the routine advances to step S102 where various sensor signals of the wheel speed pulse, front height value HF, rear height value HR, and the like are read. At step S103, whether or not the vehicle speed V calculated from the wheel speed pulse read at step S102 is lower than a preset threshold V0 is determined. The threshold V0 is set to, for example, 2 [km/h] as shown in FIG. 3. When the determination condition at step S103 is satisfied, that is, when the vehicle speed V is lower than 2 [km/h], the routine advances to step S104 where a flag Flag which will be described hereinlater is set to "0". At step S105, a timer TB which will be described hereinlater is cleared to "0". At step S106, the stop mode is determined and the weak filtering A shown in FIG. 3 is performed to the pitch angle θp calculated by the equation. A pitch angle θpf obtained by performing the weak filtering A to the pitch angle θp follows a transition state of the actual pitch angle θp to a certain extent.

On the other hand, when the determination condition at step S103 is not satisfied, that is, when the vehicle speed V is higher than 2 [km/h], the routine advances to step S107 where it is determined whether or not the absolute value of the acceleration dv/dt obtained by differentiating the vehicle speed V is equal to or lower than a preset threshold α1. The threshold α1 is set to, for example, ±2 [m/s$^2$] as shown in FIG. 3. When the determination condition at step S107 is not satisfied, that is, when the absolute value of the acceleration dV/dt exceeds the threshold α1 and is large, the routine advances to step S108 where it is determined whether or not the absolute value of the acceleration dv/dt is equal to or smaller than a threshold α2. The threshold α2 is set to the acceleration, for example, ±10 [m/s$^2$] as shown in FIG. 3 which is preset so as not to be reached in the normal driving state. When the determination condition at step S108 is satisfied, that is, when the absolute value of the acceleration dv/dt is equal to or lower than the threshold α2, the routine advances to step S109 where the time TB is cleared to "0". The routine progresses to step S110 where the acceleration or deceleration mode is determined and the weak filtering B shown in FIG. 3 is performed to the pitch angle θp calculated by the equation. The pitch angle θpf obtained by performing the weak filtering B to the pitch angle θp follows the transition state of the actual pitch angle θp to a certain extent in a manner similar to the case of the stop mode.

When the determination condition at step S108 is not satisfied, that is, when the absolute value of the acceleration dv/dt exceeds the threshold α2 and is large, the routine advances to step S111 where the flag Flag indicating that the absolute value of the acceleration dv/dt once exceeds the threshold α2 is set to "1". At step S112, the timer TB is cleared to "0". At step S113, the TRC acceleration mode at the time of the TRC control or the ABS deceleration mode at the time of the ABS control is determined and the weak filtering B shown in FIG. 3 is performed to the pitch angle θp calculated by the above equation. The pitch angle θpf obtained by performing the weak filtering B to the pitch angle θp as described above follows the transition state of the actual pitch angle θp to a certain extent in a manner similar to the stop mode.

Effectiveness of using the thresholds α1 and α2 of two stages for the absolute value of the acceleration dv/dt in the determination for the control mode switching at steps S107 and S108 will now be described with reference to the timing diagrams of FIGS. 5 and 6.

Figure 5:
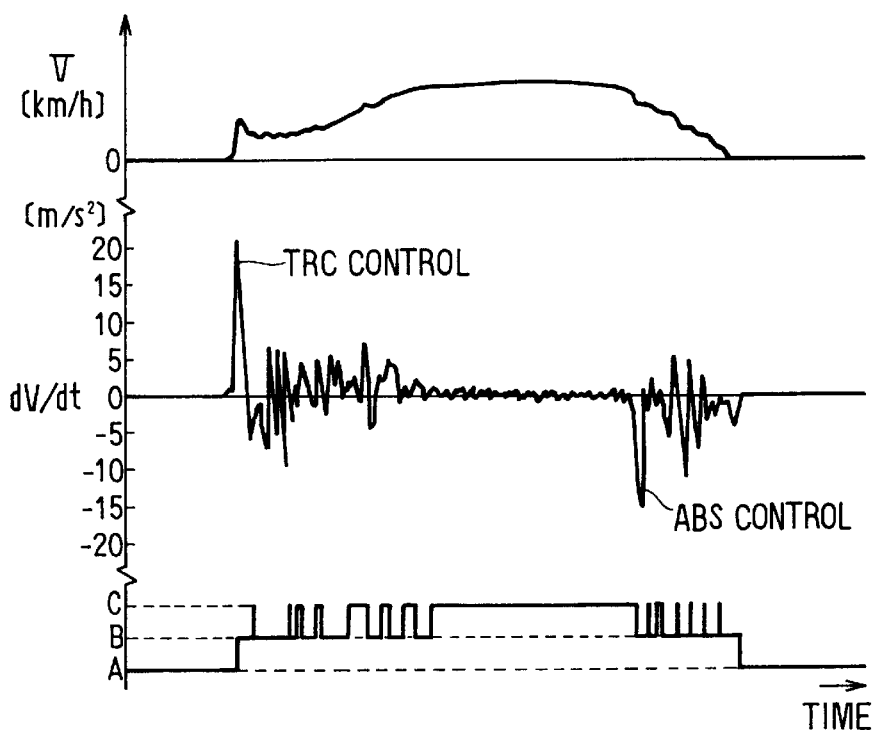
FIG. 5 is a timing diagram showing an operation of a comparative example of an optical axis control by the vehicle headlight optical axis direction automatic adjusting system.
Figure 6:
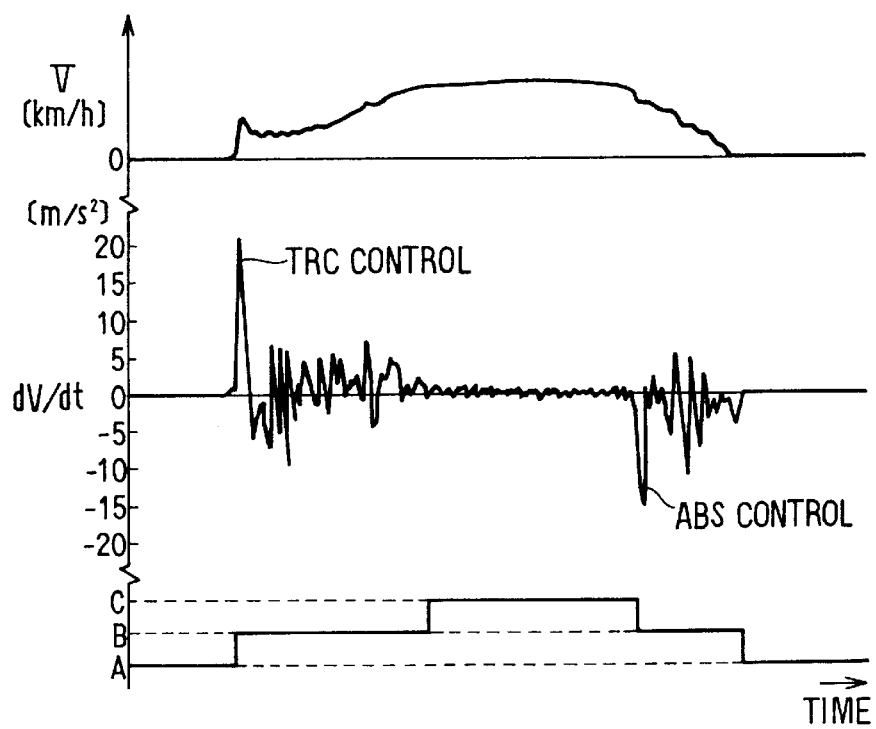
FIG. 6 is a timing diagram showing an operation of the first embodiment.

As will be understood from FIGS. 5 and 6, at the time of TRC or ABS control, the acceleration dV/dt [m/s$^2$] obtained by differentiating the speed V [km/h] largely changes to a level which can not be reached in the normal driving state. When the threshold for the absolute value of the acceleration dV/dt in the determination for the control mode switching is only one stage of ±2 [m/s$^2$] shown in FIG. 3, the control mode is frequently switched among the acceleration, deceleration, and constant speed modes in association with the large change in the acceleration dv/dt at the time of the TRC or ABS control as shown in FIG. 5. The filter corresponding to the control mode is, accordingly, frequently switched between the filters B and C as shown in FIG. 5.

In this embodiment, therefore, the thresholds for the absolute value of the acceleration dV/dt in the determination for the control mode switching are set at two stages of ±2 [m/s$^2$] and ±10 [m/s$^2$] as illustrated in FIG. 3. The threshold ±10 [m/s$^2$] is the level which can not be reached by the absolute value of the acceleration dv/dt in the normal driving state of the vehicle. It can be reached only when the acceleration dV/dt largely changes at the time of the TRC or ABS control. As shown in FIG. 6, consequently, after the TRC acceleration mode or the ABS deceleration mode is once determined based on the large change in the acceleration dv/dt at the time of the TRC or ABS control, the filter corresponding to the control mode is fixed to the filter B unless the constant speed driving state continues for a predetermined period and the filter is not frequently switched.

Meanwhile, when the determination condition at step S107 is satisfied, that is, when the absolute value of the acceleration dV/dt is equal to or smaller than the threshold α1, the routine progresses to step S114 where whether the flag Flag is "1" or not is determined. When the determination condition at step S114 is satisfied, that is, when the flag Flag at this time is "1", the routine advances to step S115 where it is determined whether or not the count time of the timer TB for counting time since the absolute value of the acceleration dv/dt once exceeds the threshold α2 is longer than preset time T0. The time T0 is set to, for example, 0.5 [sec] in which the operation of the TRC control or the ABS control is supposed to be finished. When the determination condition at step S115 is not satisfied, that is, when the count time of the timer TB is equal to or shorter than the time T0, the routine progresses to step S116 where time ΔT as a sampling period is added to the timer TB. Although the predetermined time is counted as a predetermined period in the embodiment, the number of times that the absolute value of the acceleration dV/dt is continuously equal to or smaller than the threshold α1 after once exceeding the threshold α2 may be counted.

The routine is shifted to step S113 where the weak filtering B shown in FIG. 3 corresponding to the TRC acceleration mode or the ABS deceleration mode is continuously performed in a manner similar to the above. On the other hand, when the determination condition at step S115 is satisfied, that is, when the count time of the timer TB becomes longer than the time T0, it is determined that the vehicle is in the stable constant speed driving state and the routine advances to step S117 where the flag Flag is set to "0". At step S118, the timer TB is cleared to "0".

After the process at step S118, or when the determination condition at step S114 is not satisfied, that is, when the flag Flag is "0", the routine advances to step S119 by skipping steps S115, S117, and S118. At step S119, the constant speed mode is determined and the strong filtering C shown in FIG. 3 is performed to the pitch angle θp calculated by the equation. Since high frequency components of a vibration are eliminated from the transition state of the actual pitch angle θp, no fine change is reflected in the pitch angle θpf obtained by performing the strong filtering C to the pitch angle θp.

In each of the stop mode of the vehicle at step S106, the acceleration or deceleration mode of the vehicle at step S110, the TRC acceleration mode or the ABS deceleration mode of the vehicle at step S113, and the constant speed mode of the vehicle at step S119, the actuator driving angle (target optical axis direction adjusting angle) θa which is around -pf for each filtered pitch angle θpf and at which the glare is not given to an oncoming vehicle is calculated. The routine advances to step S120 where the actuator 35L (35R) is driven on the basis of the calculated actuator driving angle θa to thereby adjust the optical axis direction of the headlight 30L (30R). After that, the routine is returned to step S102 and the processes at steps S102 to S120 are repeatedly executed. The control speed setting and the like with respect to the actuator 35L (35R) are omitted here. In such a manner, the direction of the optical axis of the headlight 30L (30R) can be properly adjusted in accordance with the driving state of the vehicle (stop mode, acceleration or deceleration mode, TRC acceleration mode or ABS deceleration mode, or constant speed mode) without being frequently switched.

A transition state of the control angle [°] according to the pitch angle [°] by the optical axis control including the TRC acceleration mode at the time of the TRC control and the ABS deceleration mode at the time of the ABS control in the embodiment will be described with reference to the timing diagram of FIG. 7.

Figure 7:
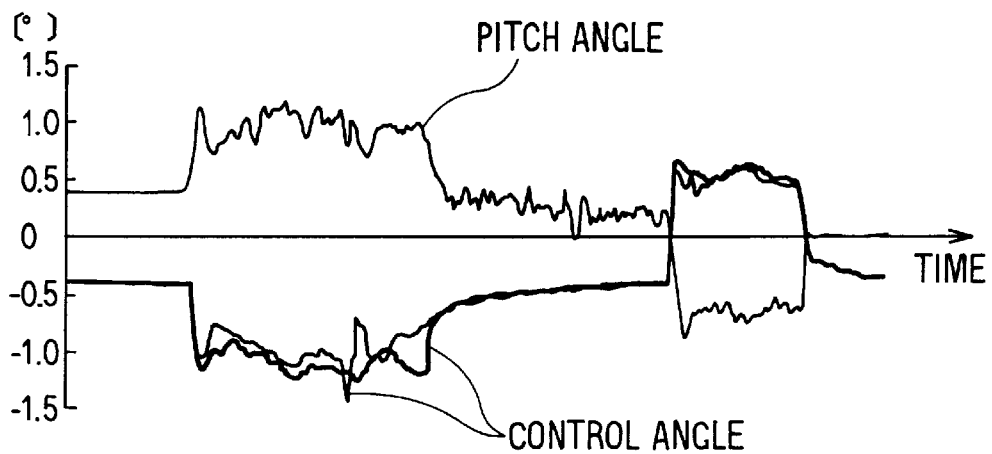
FIG. 7 is a timing diagram showing a transition state of a control angle according to a pitch angle in the first embodiment.

As control angles for comparison are shown by a thin solid line in FIG. 7, in the optical axis control using only one stage of threshold of ±2 [m/s²] for the absolute value of the acceleration dv/dt in the determination for the control mode switching, the control angle according to the pitch angle changes relatively large. On the contrary, as control angles are shown by the thick solid line in FIG. 7, according to the above-described optical axis control using two stages of thresholds of ±2 [m/s²] and ±10 [m/s²] for the absolute value of the acceleration dv/dt in the determination for the control mode switching, the control angle for the same pitch angle changes gently. As a result, the optical axis control to the headlight 30L (30R) can be performed also at the time of the TRC control and the ABS control without making the driver and the like feel strange.

As described above, the pitch angle θp in the optical axis direction of the headlights 30R and 30L of the vehicle to the horizontal plane is calculated on the basis of the output values HF and HR from the height sensors 11F and 11R arranged on the front and rear sides, respectively, of the vehicle. The filter for changing the response of the adjustment in the optical axis direction of the headlights 30L and 30R is switched by the ECU 20 in the control mode determined by the ECU 20 in accordance with the driving state from the vehicle speed V sensed by the wheel speed sensor 12 and the acceleration dV/dt calculated based on the vehicle speed V. The optical axis direction of the headlights 30R and 30L are adjusted by the ECU 20 on the basis of the pitch angle θpf obtained by performing the switched filtering to the pitch angle θp. When the absolute value of the acceleration dV/dt exceeds the highest threshold α2 set by the ECU 20, which can not be implemented in the normal driving state, the control mode corresponding to the acceleration or deceleration state of the vehicle is continued unless the constant speed state of the vehicle continues for the predetermined time T0. That is, when the absolute value of the acceleration dV/dt exceeds the threshold α2 which can be achieved only at the time of the TRC or ABS control, although the acceleration dv/dt largely changes, the vehicle posture does not change so much. After that, therefore, the optical axis direction of the headlights 30R and 30L are not allowed to follow the change in the acceleration dV/dt until the constant speed state of the vehicle continues for the predetermined time T0 and the stable driving state is obtained. When the acceleration exceeds the level which can not be reached in the normal driving state, the filter corresponding to the control mode is fixed and is not frequently switched unless the constant speed state continues for a predetermined period, the pitch angle θp is subjected to the filtering process corresponding to the driving state of the vehicle, and the optical axis direction of the headlights 30R and 30L of the vehicle are adjusted with proper response, so that the effectiveness of the optical axis control can be enhanced.

Second Embodiment

Figure 8:
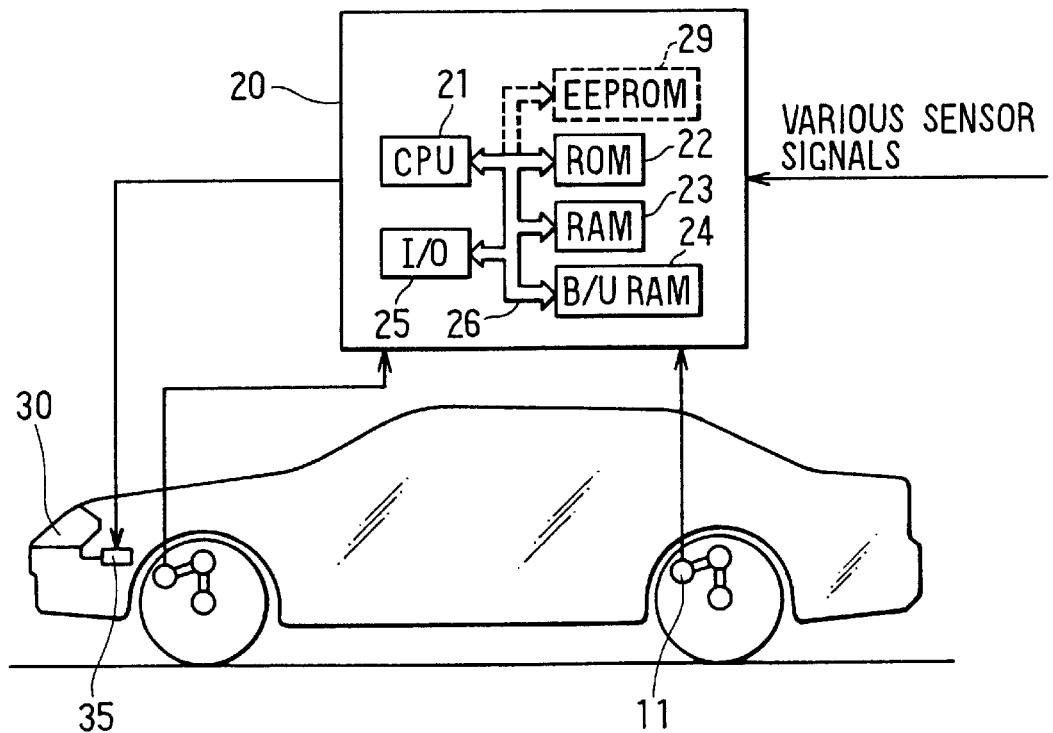
FIG. 8 is a schematic diagram showing a vehicle headlight optical axis direction automatic adjusting system according to a second embodiment of the invention.

In this embodiment as shown in FIG. 8, a height sensor 11 is attached to the rear axle of the vehicle on the driver s seat side or the front passenger seat side. A vehicle rear height value (a displacement in the vehicle height on the rear wheel side, also called "vehicle rear height measurement value" hereinbelow) HR as a relative displacement (displacement in the vehicle height) between the axle on the rear wheel side and the vehicle chassis supplied from the vehicle height sensor 11, and various sensor signals from other sensors (not shown) are supplied to the ECU 20 mounted on the vehicle.

Figure 9:
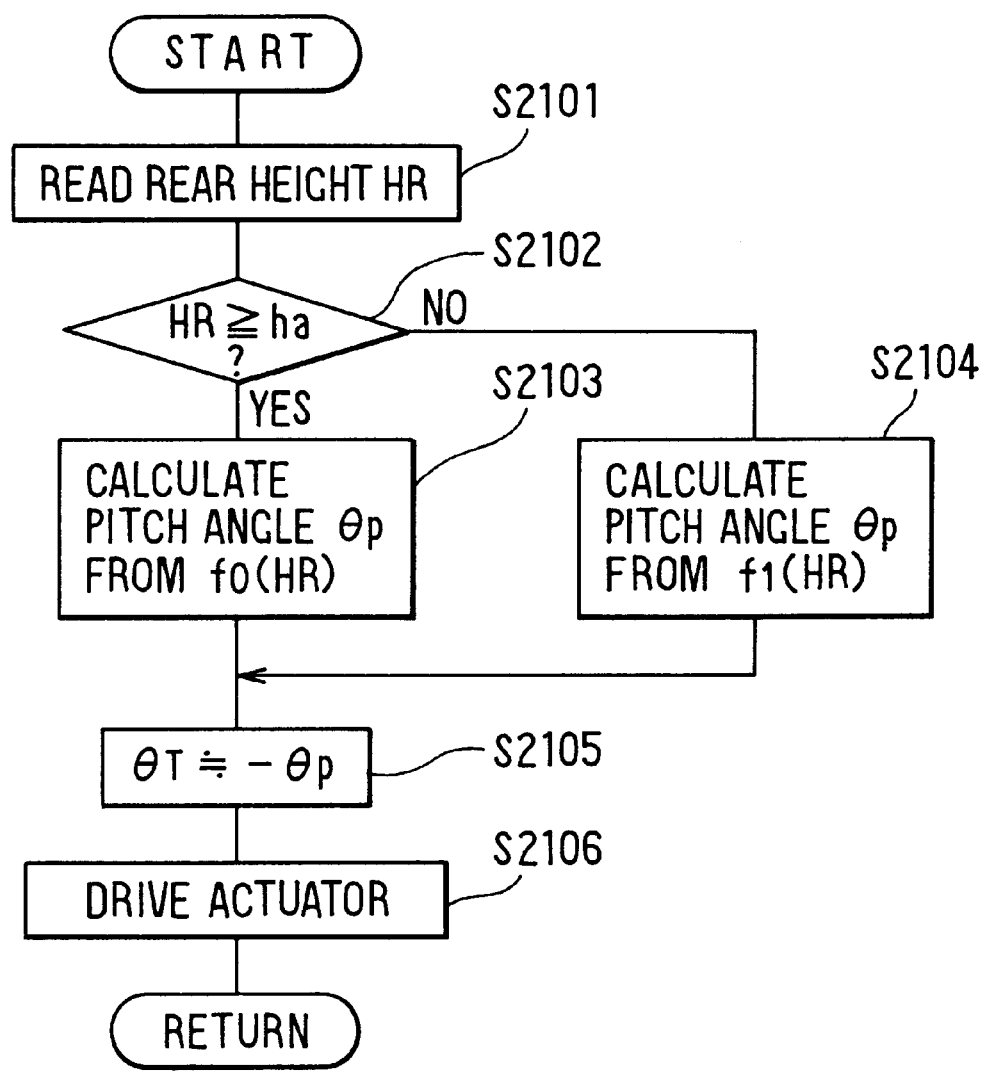
FIG. 9 is a flow diagram showing an optical axis control depending on various loading conditions in the second embodiment.
Figure 10:
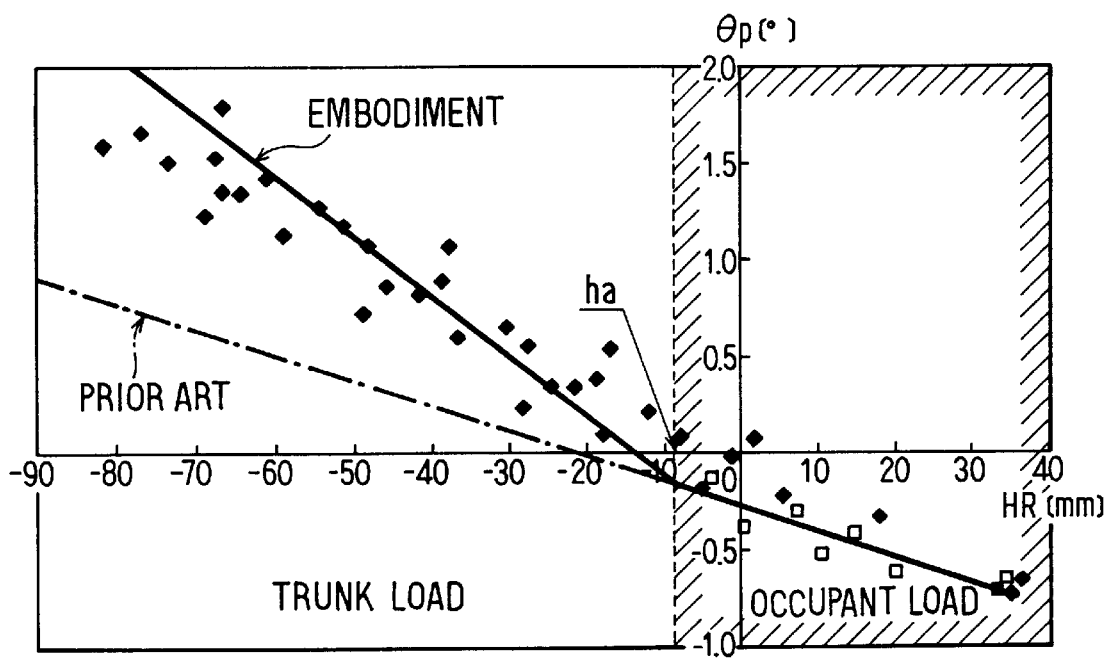
FIG. 10 is a graph showing a prediction expression which is divided into two vehicle posture regions for calculating a pitch angle on the basis of a vehicle rear height value in the second embodiment.
Figure 11:
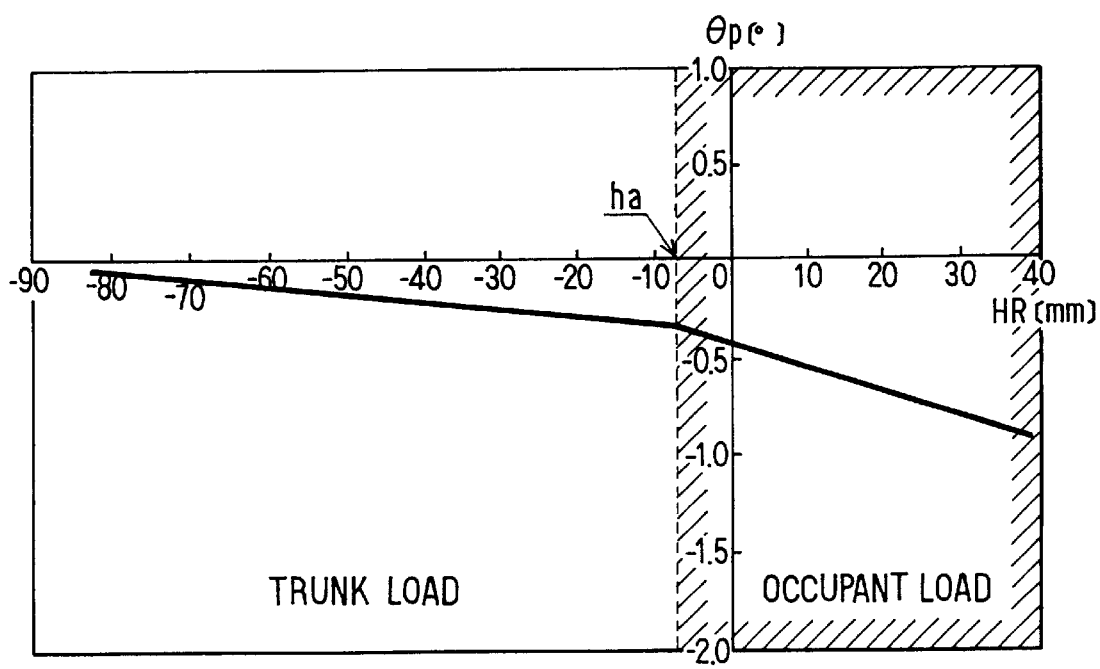
FIG. 11 is a graph showing a prediction expression which is divided into two vehicle posture regions for calculating the pitch angle on the basis of the vehicle rear height value in the second embodiment.
Figure 12:
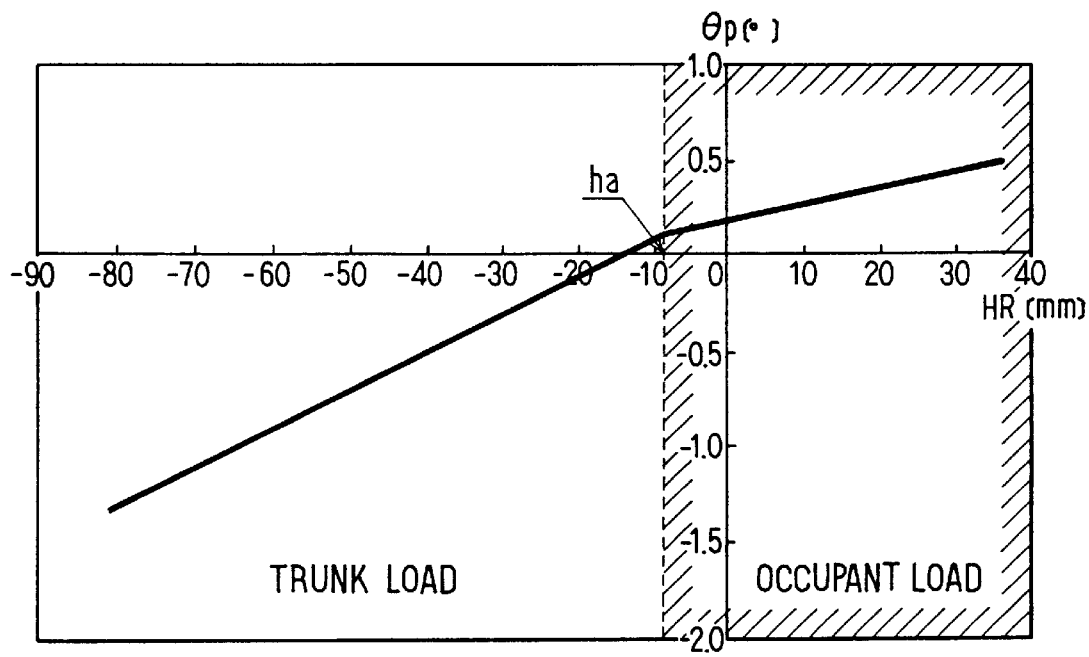
FIG. 12 is a graph showing a prediction expression which is divided into two vehicle posture regions for calculating the pitch angle on the basis of a vehicle front height value in the second embodiment.

When the control routine of FIG. 9 is executed, one of the prediction expressions in the graphs of FIGS. 10, 11, and 12 is preliminarily determined to be used in correspondence with the type of the vehicle. The graph necessary for the type of the vehicle is stored in the ROM 22 in advance.

FIG. 10 shows a graph showing a prediction expression which is divided into two regions of vehicle postures and is obtained by connecting linear expressions having different inclinations according to the loading conditions, for calculating a pitch angle [°] on the basis of the vehicle rear height value [mm]. The graph corresponds to a vehicle of a sedan type, a wagon type, or the like in which the trunk load is imposed on the rear side of the rear suspension. FIG. 11 is a graph showing a modified prediction expression which is divided into two regions of vehicle postures and is obtained by connecting linear expressions having different inclinations according to the loading conditions, for calculating the pitch angle [°] on the basis of the vehicle rear height value [mm]. The graph corresponds to a vehicle of a one box type, a mini-sized vehicle, and the like in which the trunk load is imposed on the rear suspension. FIG. 12 is a graph showing a prediction expression which is divided into two regions of vehicle postures and is obtained by connecting linear expressions having different inclinations in accordance with loading conditions, for calculating the pitch angle [°] on the basis of the vehicle front height value [mm]. The graph corresponds to a midship engine vehicle, an RR (rear-engine rear-drive) vehicle, and the like in which the trunk load is imposed on the front suspension. In this embodiment, it is assumed that the sedan type vehicle is used and the graph of FIG. 10 corresponding to the type is stored in the ROM 22 in advance.

In FIG. 9, the vehicle rear height value (vehicle rear height measured value) HR from the vehicle height sensor 11 is read at step S2101. The routine advances to step S2102 where it is determined whether the vehicle rear height value HR read at step S2101 is equal to or larger than a vehicle rear height value ha (=−9 [mm]) as a border between the occupant load region which is hatched in FIG. 10 and the trunk load region. When the determination condition at step S2102 is satisfied, that is, when the vehicle rear height value HR is equal to or larger than the vehicle rear height value ha and is within the occupant load region (the right-side hatched region in FIG. 10), the routine advances to step S2103. At step S2103, a pitch angle θp is calculated by one, f0(HR), of the prediction expressions each of which is divided into two regions of vehicle postures. For the prediction expression f0(HR), the vehicle rear height value HR read at step S2101 is substituted.

On the other hand, when the determination condition at step S2102 is not satisfied, that is, when the vehicle rear height value HR is smaller than the vehicle rear height value ha and is in the trunk load region (the left-side region which is not hatched in FIG. 10), the routine advances to step S2104. At step S2104, the pitch angle θp is calculated by the other prediction expression f1 (HR) for which the vehicle rear height value HR read at step S2101 is substituted. In FIG. 10, in the trunk load region, a conventional prediction expression indicated by an alternate long and short dash line extended from the solid line indicating the prediction expression in the occupant load region is largely deviated from the actual loading conditions shown by painted rhombus symbols. The solid line, shown as the invention, whose inclination is changed in the trunk load region almost coincides with the actual loading conditions. The painted rhombus symbols in FIG. 10 denote values measured when occupants sit on all of the seats and the open square symbols denote values measured under the loading conditions when an occupant sits on the driver's seat.

After the pitch angle θp is calculated in either step S2103 or S2104, the routine advances to step S2105 where a target optical axis direction adjustment angle (=−θp) at which the glare is not given to an oncoming vehicle is calculated for the pitch angle θp. The routine advances to step S2106 where the actuator 35 is driven on the basis of the target optical axis direction adjustment angle θT calculated at step S2105 and the routine is finished. The control speed setting and the like with respect to the actuator 35 are omitted here.

As described above, the CPU 21 in the ECU 20 calculates the pitch angle θp corresponding to the inclination angle in the optical axis direction of the headlight 30 to the horizontal plane on the basis of the vehicle rear height value HR as an output from the single vehicle height sensor 11 by using prediction expressions f0 (HR) and f1 (HR) of two vehicle postures having different inclinations in accordance with the loading conditions of the occupant load and the trunk load on each occasion. The optical axis direction of the headlight 30 is adjusted on the basis of the pitch angle θp. Consequently, for example, by preparing the expressions of two vehicle postures having different inclinations according to the loading conditions of the occupant load and the trunk load in correspondence with the vehicle type or the like, when the vehicle rear height value HR from the single vehicle height sensor 11 is sensed, the pitch angle θp according to the loading conditions on each occasion is calculated. The necessary target optical axis direction adjustment angle θT can be calculated from the pitch angle θp, and the optical axis direction of the headlight 30 is properly adjusted in accordance with the loading conditions on each occasion.

Figure 13:
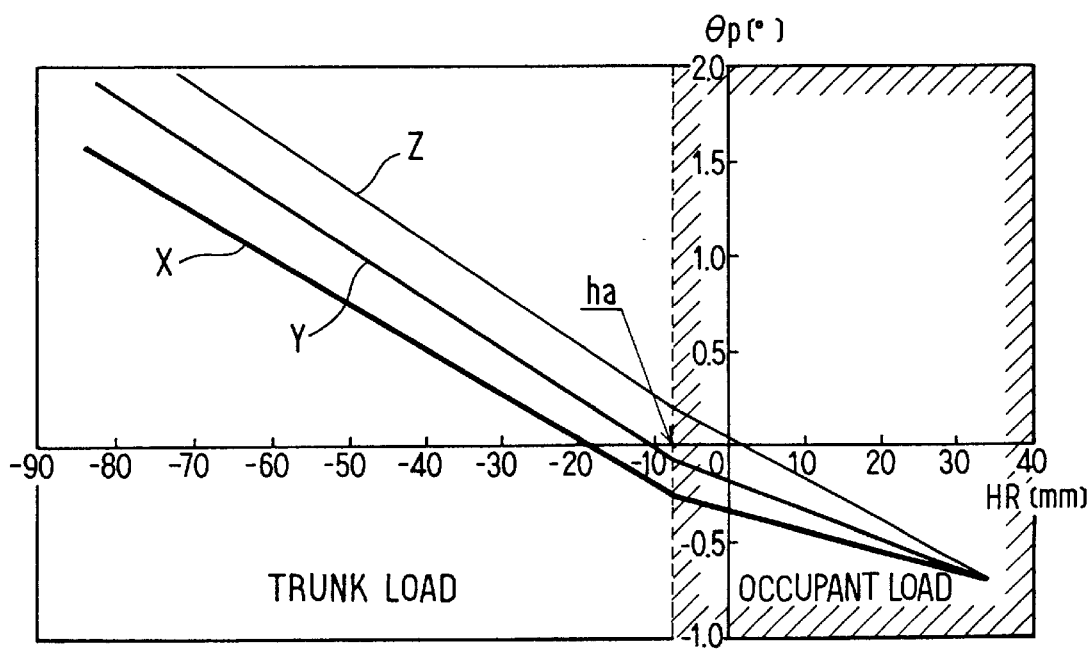
FIG. 13 is a graph showing three prediction expressions each of which is divided into two vehicle posture regions and one of which is selected based on outputs from sensors except for the vehicle height sensor in the second embodiment.

There will be described a process of adjusting the optical axis direction, which deals with various loading conditions, executed by the CPU 21 in the ECU 20 used in the vehicle headlight optical axis direction automatic adjusting system according to this embodiment when a graph having three prediction expressions each of which is divided into two regions of vehicle postures shown in FIG. 13 is used. One of the three prediction expressions is selected based on outputs from the sensors except for the vehicle height sensor.

FIG. 13 is a graph having three prediction expressions X, Y, and Z each of which is divided into two regions of vehicle postures. One of the prediction expressions is selected on the basis of outputs from the sensors except for the vehicle height sensor. In a manner similar to FIG. 10, the graph corresponds to a vehicle of the sedan type, wagon type, or the like in which the trunk load is imposed on the rear side of the rear suspension. The other sensor signals denote sensor signals from an front passenger seat sensor (not shown) which is provided for the front passenger seat and senses the riding on the front passenger seat, a load sensor (not shown) for measuring a load on the trunk, and a known G (acceleration) sensor. Specifically, the graph having three prediction expressions each of which is divided into two vehicle posture regions is preliminarily stored in the ROM 22 in the ECU 20 in correspondence with the vehicle type. One of the prediction expressions is selected in accordance with a change in the complicated actual loading conditions and the pitch angle θp can be calculated. Thus, the vehicle posture can be predicted more accurately and the optical axis direction can be more properly adjusted.

According to this embodiment, the inclination angle is calculated by the three prediction expressions each of which is divided into the two (plural) vehicle posture regions, in accordance with the outputs of sensors except for the vehicle height sensor 11. One of the three prediction expressions is selected on the basis of the outputs from the sensors except for the vehicle height sensor 11. The prediction expression according to the loading conditions on each occasion can be therefore selected from the three prediction expressions each of which is divided into two vehicle posture regions, in correspondence with the vehicle type or the like. Thus, the optical axis direction can be more properly adjusted in accordance with not only the vehicle type or the like but also the change in the complicated loading conditions on each occasion.

Third Embodiment

In this embodiment, as shown by a dotted line in FIG. 8, a non-volatile rewritable memory such as an EEPROM 29 is provided as a storing medium in which the system error information is stored in advance and the EEPROM 29 is housed in the ECU 20. The EEPROM 29 may be externally connected to the ECU 20. The system error information denotes factors exerting influence on the calculation of the inclination angle, such as an installation error of the vehicle height sensor 11 to the vehicle, an error of spring constants of the front and rear suspensions, a weight error due to variation in the specifications of the vehicle, a positional error of the center of gravity, and the like. The control routine shown in FIG. 14 is repeatedly executed every predetermined time by the CPU 21.

Figure 15:
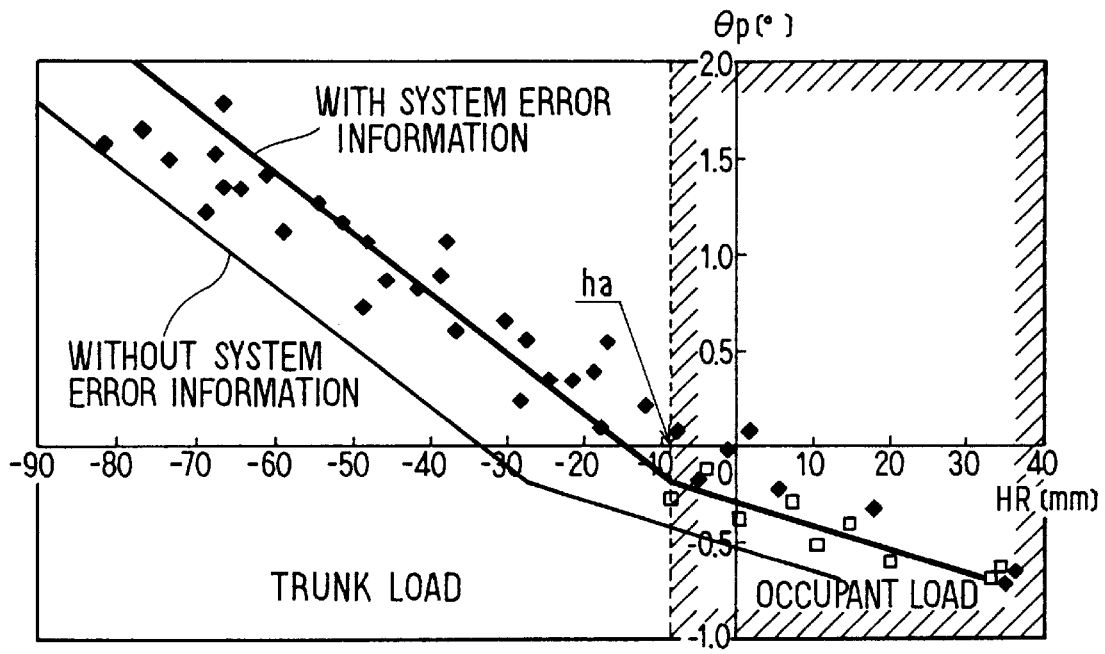
FIG. 15 is a graph showing both of a prediction expression without consideration of system error information and a prediction expression in which the system error information of an installation error of the vehicle height sensor is considered in the third embodiment.
Figure 16:
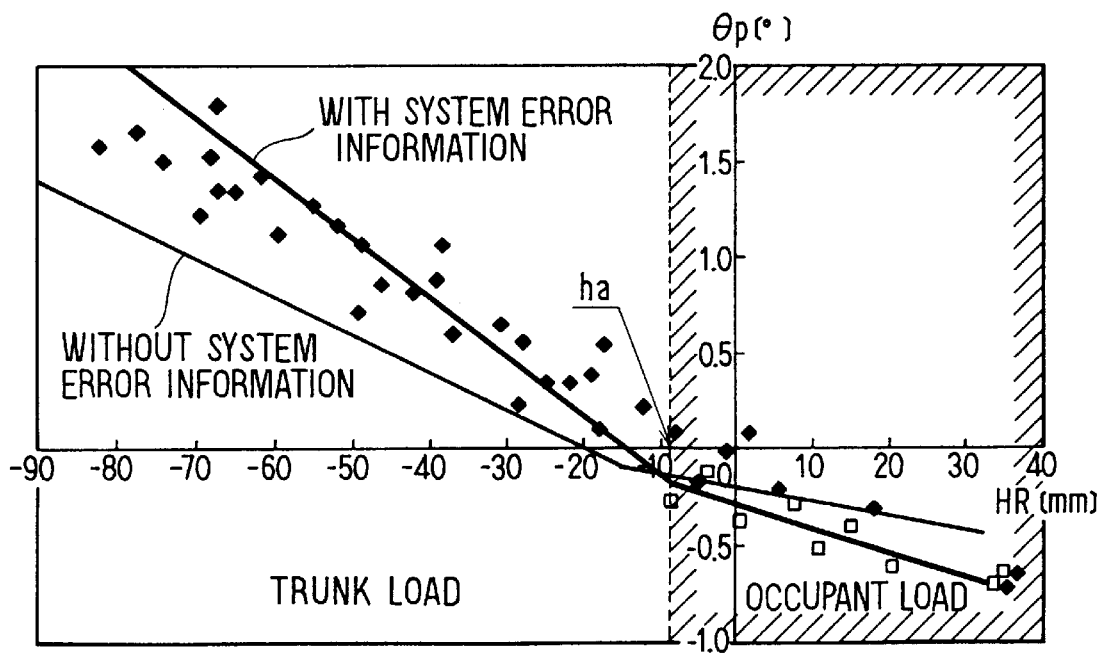
FIG. 16 is a graph showing both of a prediction expression without consideration of the system error information and a prediction expression in which the system error information when the inclination of the prediction expression is changed due to an error in spring constants of the front and rear suspensions is considered in the third embodiment.
Figure 17:
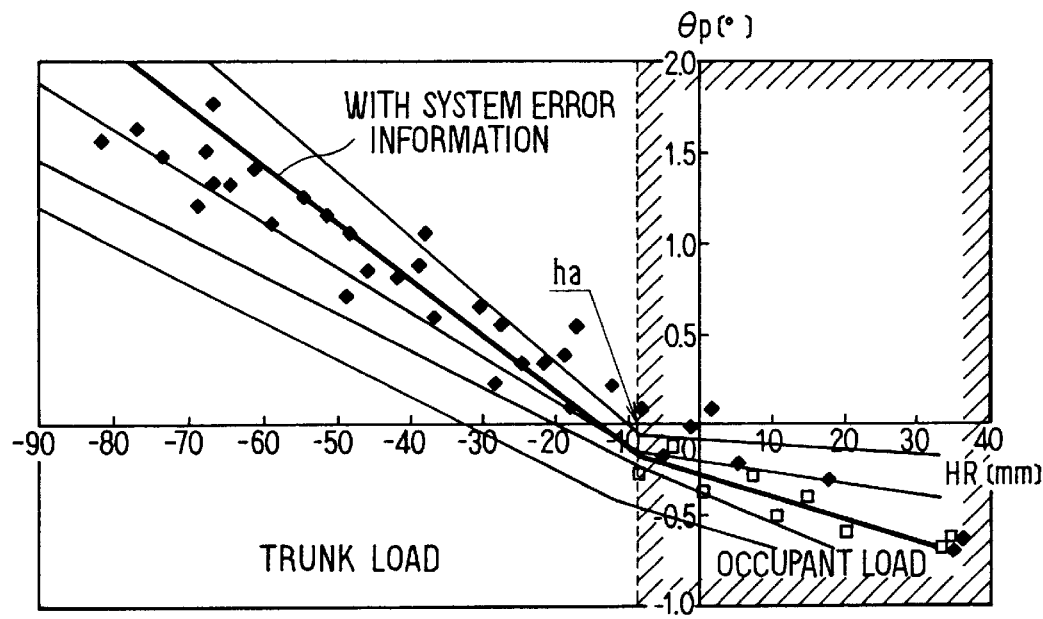
FIG. 17 is a graph showing five prediction expressions in which the system error information such as the installation error of the vehicle height sensor to the vehicle and various errors caused by other factors of the vehicle is considered in the third embodiment.

FIG. 15 is a graph showing both of a prediction expression (thin solid line) before the system error information corresponding to the characteristics of a standard vehicle is considered and a prediction expression (thick solid line) in which the system error information when there is a deviation of −20 [mm] in terms of the vehicle rear height value due to an installation error of the vehicle height sensor 11 to the vehicle is considered. FIG. 16 is a graph showing both of a prediction expression (thin solid line) before the system error information corresponding to the characteristics of a standard vehicle is considered and a prediction expression (thick solid line) in which the system error information when the inclination of the prediction expression is changed due to an error of the spring constants of the front and rear suspensions is considered. FIG. 17 is a graph showing five prediction expressions in which the system error information such as an installation error of the vehicle height sensor 11 to the vehicle and various errors caused by other factors of the vehicle is considered. Each painted rhombus symbol in the graphs of FIGS. 15, 16, and 17 denotes a value measured when occupants sit on all of the seats and each open square symbol indicates a value measured under the loading condition that an occupant sits on the driver's seat. The prediction expression corresponding to the characteristics of the standard vehicle is preliminarily stored in the ROM 22.

Figure 14:
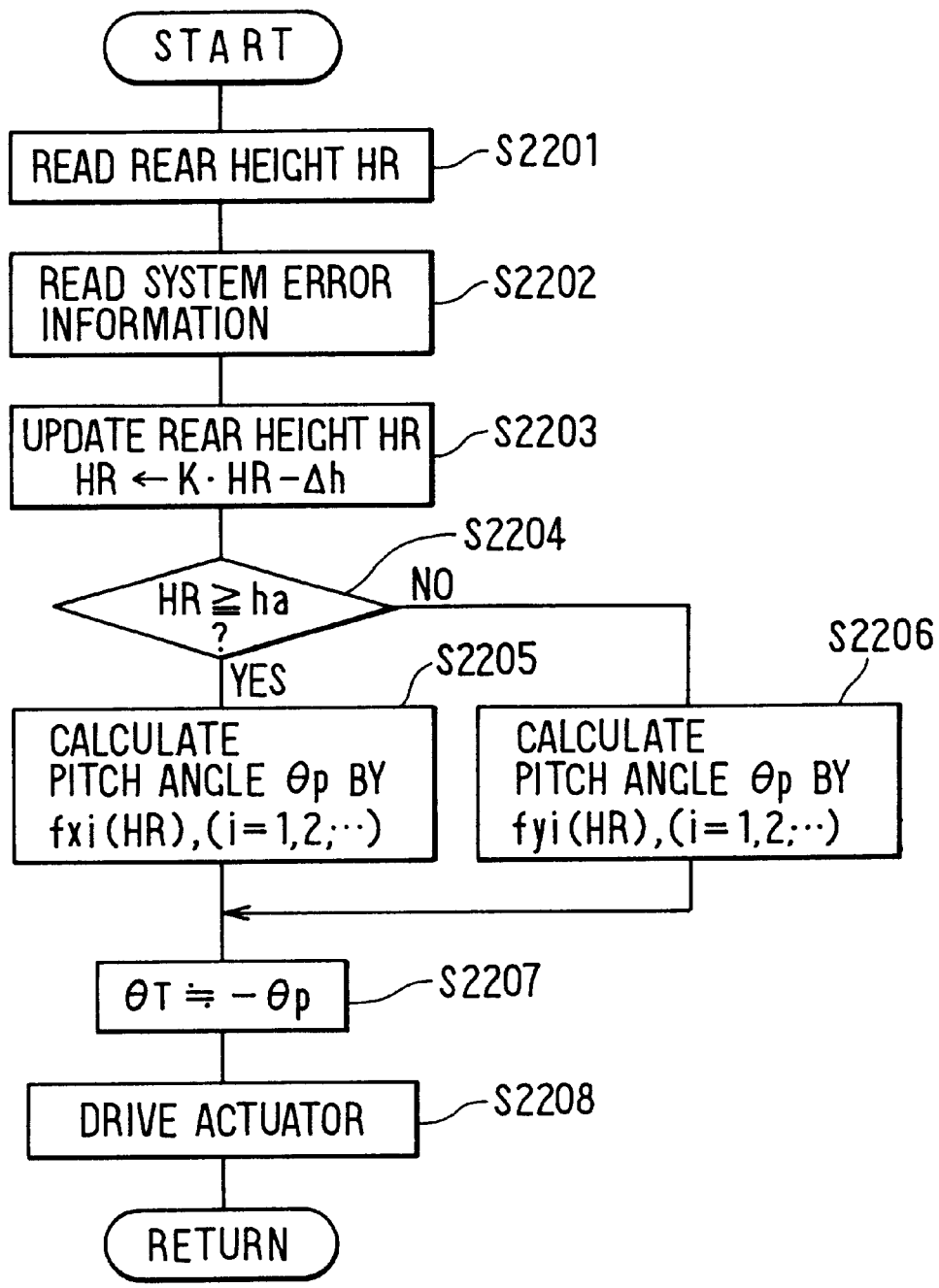
FIG. 14 is a flow diagram showing an optical axis control according to a third embodiment of the invention.

In FIG. 14, at step S2201, the vehicle rear height value (vehicle rear height measured value) HR from the vehicle height sensor 11 is read. The routine advances to step S2202 where the system error information is read. At step S2203, the vehicle rear height value HR read at step S2201 is updated by (K·HR−Δh) using a correction gain K and a correction amount (offset amount) Δh based on the system error information read at step S2202.

As the prediction expression without the system error information being considered is shown by the thin solid line in FIG. 15, when the vehicle height sensor 11 is simply installed with a deviation of −20 [mm] in terms of the vehicle rear height value HR due to the installation error, by correcting the amount of the error (correction amount Δh), the prediction expression in which the system error information is considered as shown by the thick solid line in FIG.

15 is obtained, which almost coincides with the actual loading conditions shown by the painted rhombus symbols and the open square symbols. When the inclination of the prediction expression is changed by the installation error of the vehicle height sensor 11 and the error of the spring constants of the front and rear suspensions as shown by the prediction expression before the system error information is considered indicated by the thin solid line in FIG. 16, by correcting the amount of the errors (the correction gain K and the correction amount Δh), the prediction expression in which the system error information is considered, shown by the thick solid line in FIG. 16, is obtained. The prediction expression almost coincides with the actual loading conditions shown by the painted rhombus symbols and the open square symbols.

Then, the routine advances to step S2204 where whether the vehicle rear height value HR updated at step S2203 is equal to or larger than the vehicle rear height value ha (=−9[mm]) as the border of the occupant load region illustrated as a hatched region in FIG. 17 and the trunk load region is determined. When the determination condition at step S2204 is satisfied, that is, when the vehicle rear height value HR is equal to or larger than the vehicle rear height value ha and is within the occupant load region (the right-side hatched region in FIG. 17), the routine progresses to step S2205. At step S2205, one of the five prediction expressions fxi(HR), (i=1, 2, . . . , 5) each of which is divided into two vehicle posture regions is selected. The vehicle rear height value HR updated at step S2203 is substituted for the selected prediction expression, thereby calculating the pitch angle θp.

On the other hand, when the determination condition at step S2204 is not satisfied, that is, when the vehicle rear height value HR is smaller than the vehicle rear height value ha and is in the trunk load region (the left-side region which is not hatched in FIG. 17), the routine advances to step S2206. At step S2206, one of the five prediction expressions fyi(HR) (i=1, 2, . . . , 5) each of which is divided into two vehicle posture regions is selected and the vehicle rear height value HR updated at step S2203 is substituted for the selected prediction expression, thereby calculating the pitch angle θp. In this case, in FIG. 17, the selected prediction expression in which the system error information is considered almost coincides with the actual loading conditions shown by the painted rhombus symbols and the open square symbols.

After the pitch angle θp is calculated at step S2205 or S2206, the routine advances to step S2207 where the target optical axis direction adjustment angle θT (≈−θp) at which no glare is given to an oncoming vehicle is calculated for the pitch angle θp. At step S2208, the actuator 35 is driven on the basis of the target optical axis direction adjustment angle θT calculated at step S2207 and the routine is finished. The control speed setting and the like with respect to the actuator 35 are omitted here.

As described above, the pitch angle θp corresponding to the inclination angle in the optical axis direction of the headlight 30 to the horizontal plane is calculated on the basis of the vehicle rear height value HR as an output from the single vehicle height sensor 11 and the system error information stored in the EEPROM 29 by using the prediction expressions fxi(HR) and fyi(HR) in the two regions of vehicle postures having different inclinations in accordance with the loading conditions of the occupant load and the trunk load on each occasion, and the optical axis direction of the headlight 30 is adjusted on the basis of the pitch angle θp. For example, the prediction expression which is divided into two regions of vehicle postures having different inclinations in accordance with the loading conditions of the occupant load and the trunk load is prepared in correspondence with the vehicle type or the like. When the system error information is used in addition to the vehicle rear height value HR from the single vehicle height sensor 11, the pitch angle θp according to the loading conditions on each occasion is calculated. The necessary target optical axis direction adjustment angle θT can be calculated from the pitch angle θp, and the optical axis direction of the headlight 30 can be properly adjusted in accordance with the loading conditions on each occasion.

Although the graph which is divided into two regions of the occupant load region and the trunk load region is used as the prediction expression which is divided into a plurality of regions of vehicle postures in accordance with the loading conditions in the foregoing embodiments, the invention is not limited to the above. When the vehicle posture changes according to the load position in the same occupant load region or trunk load region, the graph may be further divided. A graph which is divided into three or more regions may also be used. Although the prediction expression is a broken line obtained by connecting linear expressions of different inclinations according to the loading conditions, an arbitrary function such as higher order expression, exponential function, and the like can be used. Even when the prediction expression is a higher order expression, to simplify the program, the graph can be divided into a number of regions and each region can be approximated to a linear expression. Further, in a vehicle of a type such that the pitch angle θp does not change even when the vehicle rear height value HR changes, the prediction expression can be set to constant (zero-order expression).

Although the pitch angle θp is calculated from the vehicle rear height value HR by using the graph of the prediction expression which is divided into the plurality of vehicle posture regions in the embodiment, for example, the pitch angle may be calculated after estimating the vehicle front height value from the vehicle rear height value.

Fourth Embodiment

Figure 18:
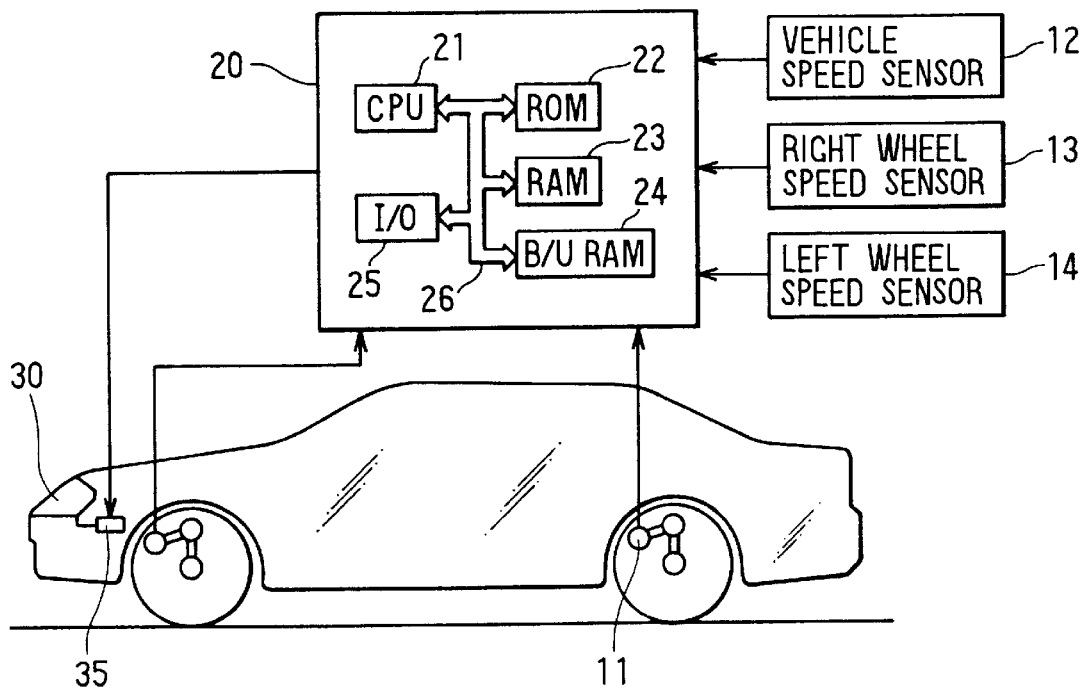
FIG. 18 is a schematic diagram showing a whole construction of a vehicle headlight optical axis direction automatic adjusting system according to a fourth embodiment of the invention.

In FIG. 18, the ECU 20 is connected to receive, in addition to the measured vehicle rear height from the height sensor 11, a vehicle speed V from a known vehicle speed sensor 12 disposed on the vehicle, a right-wheel speed VWR from a right-wheel speed sensor 13, a left-wheel speed VWL from a left-wheel speed sensor 14, and various sensor signals from other sensors (not shown). The various sensor signals from the vehicle speed sensor 12, the right-wheel speed sensor 13, the left-wheel speed sensor 14, and the like are used to determine a driving mode of the vehicle such as stop mode, acceleration or deceleration mode, and constant speed driving (stable driving) mode, and to determine whether the vehicle is in a turning state or not.

A fundamental idea of determining that the vehicle is stopped riding on a block or the like, in a control of adjusting the optical axis direction of the headlight 30 according to the embodiment of the invention will be described with reference to FIGS. 19 and 20.

Figure 19:
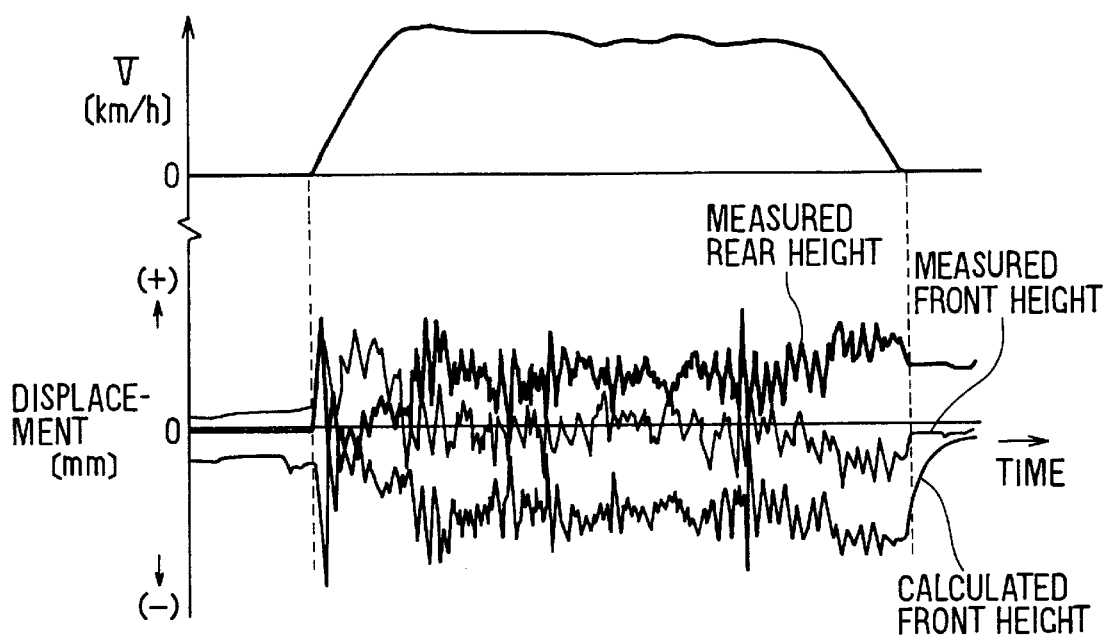
FIG. 19 is a timing diagram for explaining an inconvenience that the vehicle is stopped riding on a block or the like when no headlight optical axis adjustment is applied.

FIG. 19 is a timing diagram showing a transition state of a displacement [mm] in each of the rear height value measured by the height sensor 11 according to a change in the vehicle speed [km/h], a measured front height based on the measured rear height, and a measured front height for comparison. The vehicle speed changes in accordance with the order of a state where the vehicle is stopped riding on a block or the like, acceleration, constant speed driving, deceleration, and a state where the vehicle is stopped on a flat place.

In FIG. 19, in the initial vehicle stop mode, a state where the rear suspension contracts when the vehicle is stopped riding on a block or the like is sensed and the measured rear height is obtained. After that, the front height value is calculated based on the displacement in the measured rear height, so that the measured front height includes an error and is largely deviated from the actual measured front height. An error accordingly occurs in calculation of the pitch angle of the vehicle body. When the optical axis direction of the headlight 30 is adjusted based on the pitch angle, the direction is deviated from a proper angle and glare may be given to an oncoming vehicle or the like.

Figure 20:
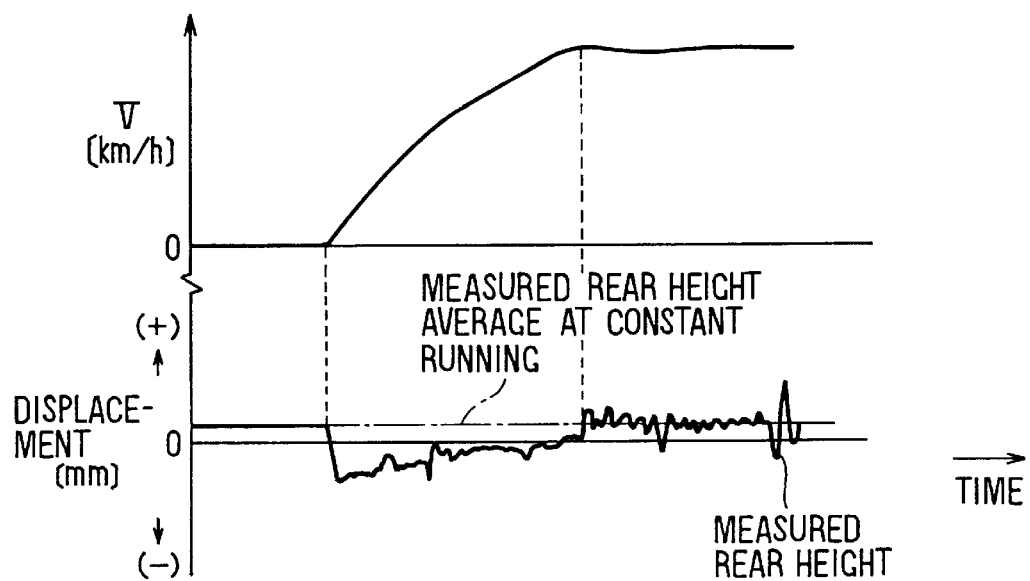
FIG. 20 is a timing diagram showing a transition of a measured rear height according to a change in the speed of the vehicle, based on which the optical axis direction of the headlight is adjusted in the fourth embodiment.

FIG. 20 is a timing diagram showing a transition state of the rear height value measured by the height sensor 11 according to a change in the vehicle speed [km/h] when the vehicle changes from the state where the vehicle is stopped on a flat place, an acceleration mode, and to a constant speed driving mode.

It will be understood from FIG. 20 that the displacement in the measured rear height shifts with the change in the vehicle speed [km/h], that is, the measured rear height changes finely due to a rough road surface in the vehicle driving mode. An average displacement in the measured rear height in the constant speed driving (stable driving) mode almost coincides with the displacement in the measured rear height in the vehicle stop mode. The measured rear heights in the constant speed driving mode are averaged and an average is compared with the measured rear height in the stop mode. If there is a deviation of a predetermined threshold or larger, the measured rear height in the stop mode is replaced by the measured rear height averaged in the constant speed driving mode and then the front height value is calculated, thereby allowing the error described with reference to FIG. 19 to be corrected. In this case, it is important that the average is obtained in the constant speed driving mode. Since the measured rear height equivalent to that when the vehicle is stopped on a flat place is not obtained during the acceleration or deceleration, driving on a rough road, turning, and the like, the correction is not executed in these states. Although the execution of the correction of the error is determined by comparing the measured rear height in the stop mode with that in the constant speed driving mode, it can also be determined by any physical amount influenced by any of various factors such as optical axis direction adjustment control position, pitch angle, and the like.

A procedure for dealing with a case where the vehicle is stopped riding on a block or the like, executed by the CPU 21 in the ECU 20 used in the embodiment of the invention will be described based on the flow diagram of FIG. 21. The control routine is repeatedly executed every predetermined time by the CPU 21.

Figure 21:
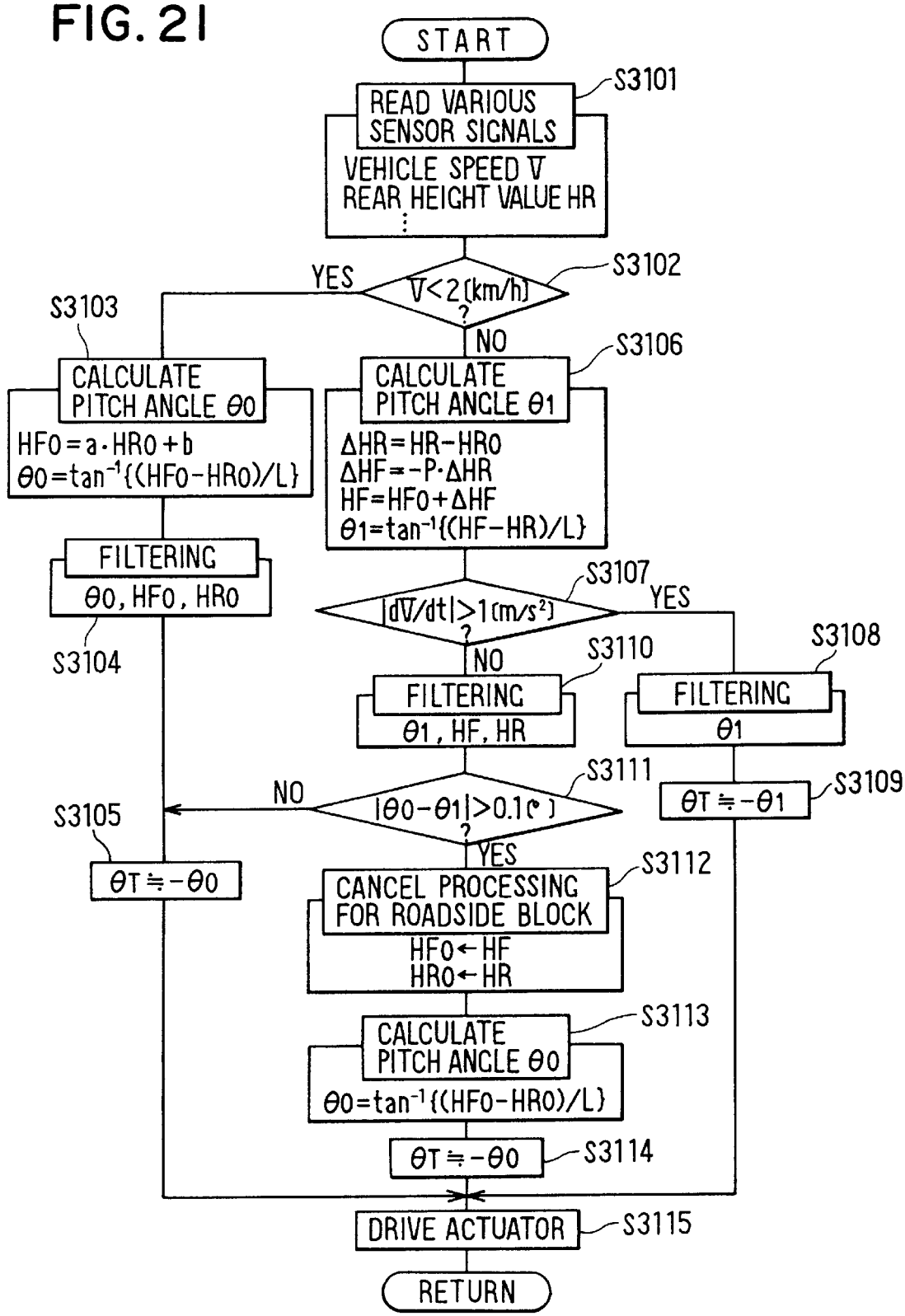
FIG. 21 is a flow diagram showing a procedure for dealing with the case where the vehicle is stopped riding on a block or the like, executed by the in the fourth embodiment.

In FIG. 21, at step S3101, various sensor signals such as the vehicle speed V from the vehicle speed sensor 12 and the rear height value (measured rear height) HR from the height sensor 11 are read. When the vehicle is in the stop mode at this time, the rear height value HR is set to the rear height value (measured rear height) HR0 in the stop mode. Then, the routine advances to step S3102 where it is determined whether or not the vehicle speed V read at step S3101 is lower than 2 [km/h]. When the determination condition at step S3102 is satisfied, that is, when the vehicle speed V is lower than 2 [km/h], it is determined that the vehicle is in the stop mode and the routine advances to step S3103. At step S3103, a pitch angle θp in the vehicle stop mode is calculated by the following equations (1) on the basis of the measured rear height HR0 in the stop mode. HF0 denotes a measured front height in the stop mode, a and b denote constants which are preset by spring constants or the like in the specification the suspensions of the front and rear wheels, and L indicates an axle base between the front and rear wheels.

[Equation 1]

$$HF0 = a \cdot HR0 + b$$
$$\theta 0 = \tan^{-1}\{(HF0 - HR0)/L\} \quad (1)$$

The routine advances to step S3104 where a filtering process such as moving averaging is executed to the pitch angle θ0 calculated at step S3103, the measured front height HF0 in the stop mode, and the measured rear height HR0. At step S3105, a target optical axis direction adjustment angle θT (≒−θ) at which no glare is given to an oncoming vehicle is calculated for the pitch angle θp in the stop mode which is filtered at step S3104.

On the other hand, when the determination condition at step S3102 is not satisfied, that is, when the vehicle speed V is equal to or higher than 2 [km/h], it is determined that the vehicle is in the driving mode. The routine proceeds to step S3106 where the pitch angle θ1 in the driving mode of the vehicle is calculated by the following equations (2) on the basis of the measured rear height HR at this time and the measured rear height HR0 in the stop mode. ΔHR denotes a displacement in the measured rear height, P indicates a correction factor of about 0.5 to 2 which is preset by spring constants in the specification of the front and rear wheel suspensions, or the like, ΔHF shows a displacement in the front height calculation value, HF denotes the front height calculation value, and HF0 indicates the front height calculation value in the stop mode.

[Equation 2]

$$\Delta HR = HR - HR0$$
$$\Delta HF = -P \cdot HR$$
$$HF = HF0 + \Delta HF$$
$$\theta 1 = \tan^{-1}\{(HF - HR)/L\} \quad (2)$$

The routine advances to step S3107 where it is determined whether or not the absolute value dV/dt of the acceleration obtained by differentiating the vehicle speed V is larger than 1 [m/S$^2$]. When the determination condition at step S3107 is satisfied, that is, when the absolute value dV/dt of the acceleration is larger than 1 [m/S$^2$], the acceleration or deceleration mode is determined. The routine advances to step S3108 where the pitch angle θ1 calculated at step S3106 is subjected to a predetermined filtering process. At step S3109, the target optical axis direction adjustment angle θT (≒−θ1) at which no glare is given to an oncoming vehicle is calculated for the pitch angle θ1 in the acceleration or deceleration mode, which is subjected to the filtering process at step S3108.

On the other hand, when the determination condition at step S3107 is not satisfied, that is, when the absolute value dv/dt of the acceleration is smaller than 1 [m/S$^2$], the constant speed driving mode is determined. The processing routine advances to step S3110 where the pitch angle θ1 calculated at step S3106, the measured front height HF, and the measured rear height HR are subjected to the predetermined filtering process. At step S3111, it is determined whether or not the absolute value of a deviation between the pitch angle θ0 in the stop mode and the pitch angle θ1 in the constant speed driving mode is larger than 0.1 [°]. When the determination condition at step S3111 is not satisfied, that is, when |θ0−θ1| is equal to or smaller than 0.1 [°], it is determined that the present pitch angle θ1 does not have to be processed. The routine advances to step S3105 where the target optical axis direction adjustment angle θT ($\doteq$ −θ0) at which no glare is given to an oncoming vehicle is calculated for the pitch angle θ0 in the stop mode which is subjected to the filtering process at step S3104.

On the other hand, when the determination condition at step S3111 is satisfied, that is, when |θ0−θ1| is larger than 0.1 [°], the pitch angle θ0 at that time shows some inconvenience that the vehicle is stopped riding on a block or the like, that is, it is determined that the reference angle in the stop mode of the vehicle is abnormal. The routine advances to step S3112 where, as a process for cancelling the inconvenience that the vehicle is riding on a block or the like, the measured rear height HR and the front height calculation value HF in the constant speed driving mode are replaced by the measured rear height HR0 and the front height calculation value HF0 in the stop mode. At step S3113, in a manner similar to the equations (1), the pitch angle θ0 in the constant speed driving mode of the vehicle is calculated and the pitch angle θ0 in the stop mode is updated. At step S3114, the target optical axis direction adjustment angle θT ($\doteq$ −θ0) at which no glare is given to an oncoming vehicle is calculated for the pitch angle θ0 in the constant speed driving mode which is calculated at step S3113.

After the process of step S3105, S3109, or S3114, the routine advances to step S3115 where the actuator 35 is driven on the basis of the calculated target optical axis direction adjustment angle θT and the routine is finished. Control speed setting and the like with respect to the actuator 35 are omitted. Consequently, even in the case where the vehicle is riding on a block or the like in the stop mode and the pitch angle θ0 at this time is abnormal, once the constant speed driving mode is determined, the process for cancelling the inconvenience that the vehicle is stopped riding on a block or the like is executed to update the pitch angle θ0 without waiting for the end of one trip. After that, the optical axis direction of the headlight 30 is properly adjusted.

Figure 22:
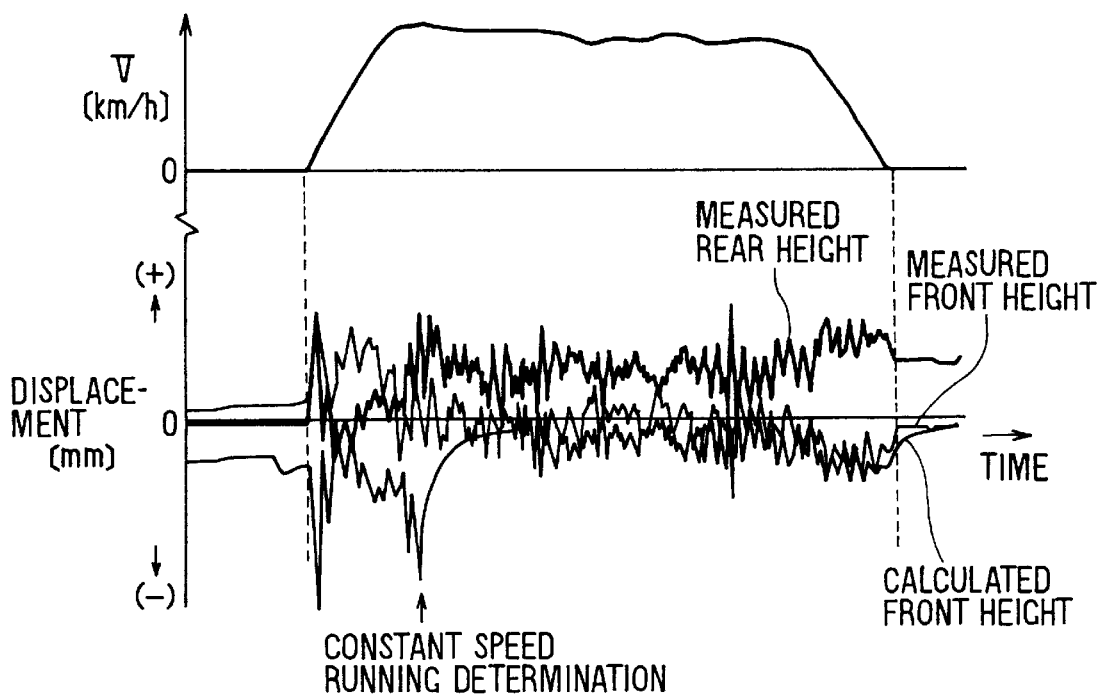
FIG. 22 is a timing diagram showing a transition of each displacement according to the change in the vehicle speed, based on the flow diagram of FIG. 21.

FIG. 22 is a timing diagram showing transition of the displacement [mm] of each of the rear height value measured by the height sensor 11 according to a change in the vehicle speed [km/h] when the correction to the error described with reference to FIG. 19 is executed on the basis of the flow diagram of FIG. 21, the front height calculation value based on the measured rear height, and the measured front height for comparison.

In FIG. 22, the conditions of the vehicle speed, road surface, and the like are similar to those in FIG. 19, after the constant speed driving mode is determined, the front height calculation value follows the measured front height almost at the same level. It is understood that the error of the displacement caused when the vehicle is stopped riding on a block or the like is cancelled.

Figure 23:
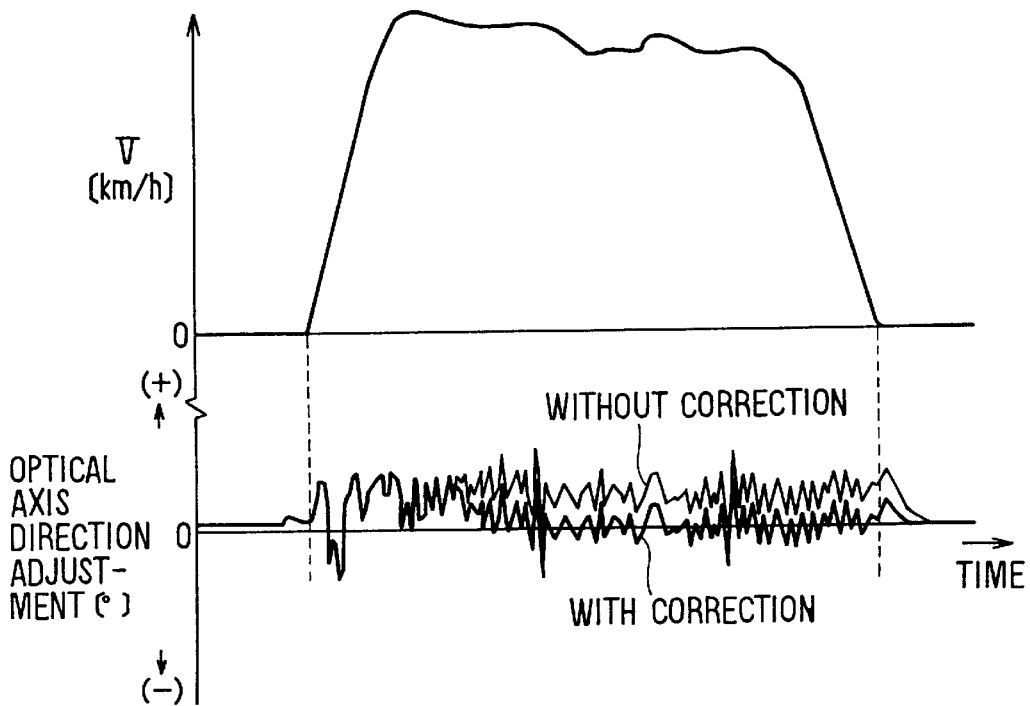
FIG. 23 is a timing diagram showing an optical axis direction adjustment amount of the headlight of the vehicle which is corrected based on the flow diagram of FIG. 21 and an optical axis direction adjustment amount which is not corrected for comparison.

Specifically, as shown by a value which is not corrected in FIG. 23, in the case where there is an error in the displacement caused when the vehicle is stopped riding on a block or the like, an error occurs in the optical axis direction adjustment amount [°] of the headlight 30 of the vehicle and the optical axis is directed upward. On the contrary, when the vehicle enters the constant speed driving mode in accordance with a change in the vehicle speed [km/h], the determination condition is satisfied and the error in the displacement caused when the vehicle is stopped riding on a block or the like is cancelled, as shown by the corrected value in FIG. 23, there is no error in the optical axis direction adjustment amount [°] of the headlight 30 of the vehicle and the optical axis direction is returned to an almost initial position.

As described above, the pitch angle θ0 in the stop mode or the pitch angle θ1 in the driving mode corresponding to the inclination angle in the optical axis direction of the headlight 30 to the horizontal plane is calculated by the CPU 21 on the basis of either the measured rear height HR0 in the stop mode or the measured rear height HR in the driving mode as an output of the single height sensor 11. When the driving mode of the vehicle determined by the CPU 21 is the constant speed driving mode and the pitch angle θ0 corresponding to the reference angle is abnormal, the pitch angle θ0 in the stop mode is updated on the basis of the measured rear height HR in the driving mode. The pitch angle θ1 in the driving mode is corrected by the CPU 21 on the basis of the pitch angle θ0, and the optical axis direction of the headlight 30 is adjusted. Even in the case where the vehicle is stopped riding on a block or the like and the optical axis direction of the headlight 30 is deviated, when the vehicle enters the constant speed driving mode before one trip is finished, the pitch angle θ0 in the stop mode is updated and the pitch angle θ1 in the driving mode is corrected. The deviation in the optical axis direction of the headlight 30 can be, therefore, properly adjusted.

Fifth Embodiment

This embodiment is a modification of the procedure for dealing with the case where the vehicle is stopped riding on a block or the like. The control routine is repeatedly executed every predetermined time by the CPU 21.

Figure 24:
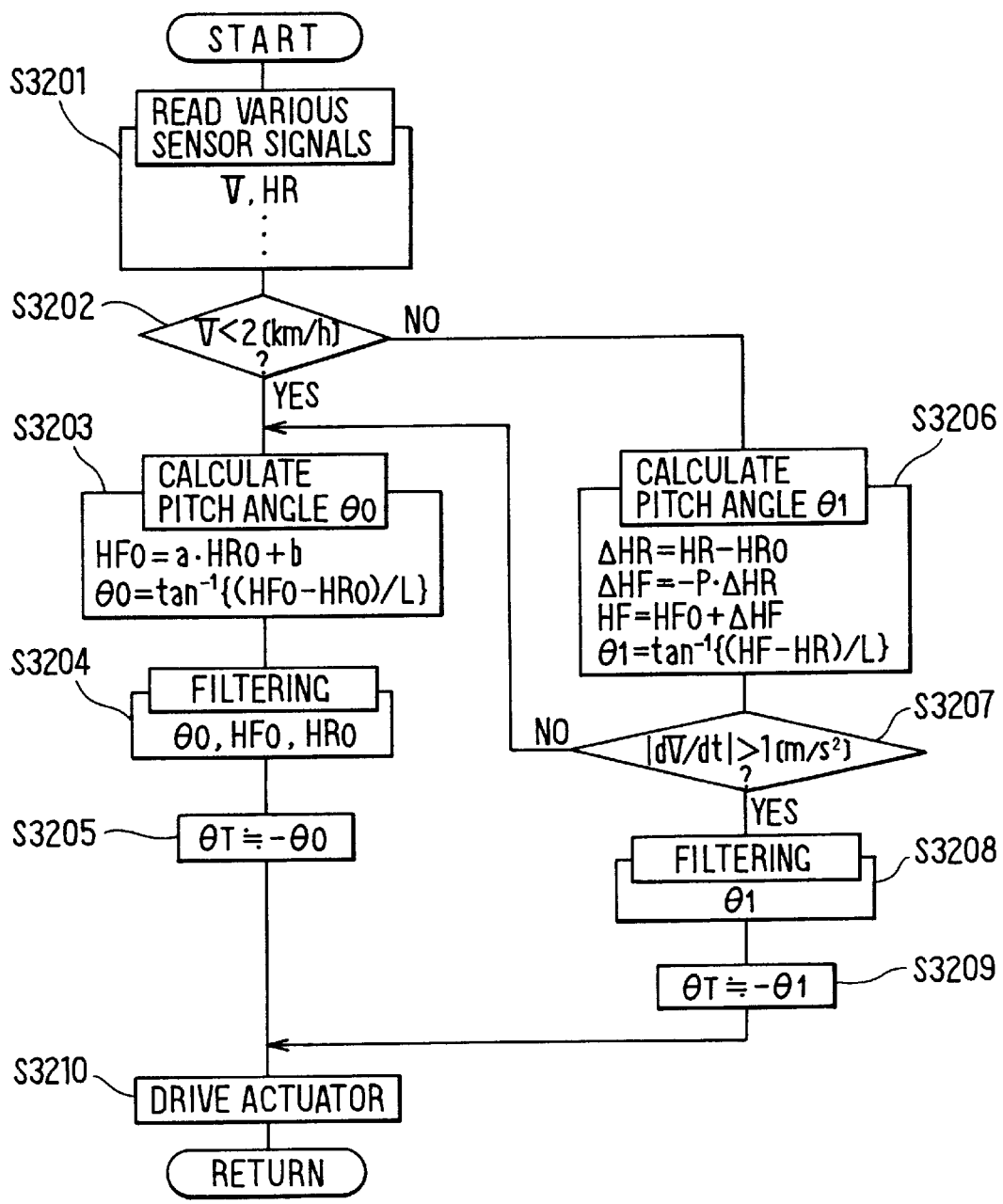
FIG. 24 is a flow diagram showing a modification of the procedure for dealing with the case where the vehicle is stopped riding on a block or the like, executed by the CPU in a fifth embodiment of the present invention.

As shown in FIG. 24, first at step S3201, the various sensor signals such as the vehicle speed V from the vehicle speed sensor 12 and the rear height value (measured rear height) HR from the height sensor 11 are read. When the vehicle is in the stop mode at this time, the rear height value HR is replaced by the rear height value (measured rear height) HR0 in the stop mode. The routine advances to step S3202 where it is determined whether or not the vehicle speed V read at step S3201 is lower than 2 [km/h]. When the determination condition at step S3202 is satisfied, that is, when the vehicle speed V is lower than 2 [km/h], the stop mode of the vehicle is determined. The routine advances to step S3203 where the pitch angle θ0 in the stop mode of the vehicle is calculated by the equation (1) on the basis of the measured rear height HR0 in the stop mode.

The routine proceeds to step S3204 where the pitch angle θ0 calculated at step S3203, the front height calculation value HF0 in the stop mode, and the measured rear height HR0 are subjected to the filtering process such as moving averaging. The routine advances to step S3205 where the target optical axis direction adjustment angle θT ($\doteq$ −θ0) at which no glare is given to an oncoming vehicle or the like is calculated for the pitch angle θ0 in the stop mode which is filtered at step S3204.

On the other hand, when the determination condition at step S3202 is not satisfied, that is, when the vehicle speed V is equal to or higher than 2 [km/h], it is determined that the vehicle is in the driving mode. The routine advances to step S3206 where the pitch angle θ1 in the driving mode of the vehicle is calculated by the equation (2) on the basis of the measured rear height HR at this time and the measured rear height HR0 in the stop mode.

The routine advances to step S3207 where it is determined whether or not |dv/dt| as an absolute value of the acceleration obtained by differentiating the vehicle speed V is larger than 1 [m/S$^2$]. When the determination condition at step S3207 is satisfied, that is, when |dV/dt| as an absolute value of the acceleration is larger than 1 [m/S$^2$], it is determined that the vehicle is in the acceleration or deceleration mode. The routine advances to step S3208 where the pitch angle θ1 calculated at step S3206 is subjected to the predetermined filtering process. The routine proceeds to step S3209 where the target optical axis direction adjustment angle θT (≐−θ0) at which no glare is given to an oncoming vehicle is calculated for the pitch angle θ1 in the deceleration or acceleration mode which is subjected to the filtering process at step S3208.

On the other hand, when the determination condition at step S3207 is not satisfied, that is, when |dV/dt| as an absolute value of the acceleration is equal to or smaller than 1 [m/S$^2$], the constant speed driving mode is determined. The routine advances to step S3203 where a similar process is executed.

After the process at step S3205 or S3209, the routine advances to step S3210 where the actuator 35 is driven on the basis of the calculated target optical axis direction adjustment angle θT, and the routine is finished. The control speed setting and the like with respect to the actuator 35 are omitted. Consequently, even if the vehicle is stopped riding on a block or the like and the pitch angle θ0 is abnormal, once the constant speed driving mode is determined, the process for cancelling the error caused when the vehicle is stopped on the curb or the like is performed to thereby update the pitch angle θ0 without waiting for completion of one trip. After that, the optical axis direction of the headlight 30 can be properly adjusted.

As described above, the pitch angle θ0 in the stop mode or the pitch angle θ1 in the driving mode corresponding to the inclination angle in the optical axis direction of the headlight 30 to the horizontal plane is calculated by the CPU 21 on the basis of either the measured rear height HR0 in the stop mode or the measured rear height HR in the driving mode as an output of the single height sensor 11. When the driving mode of the vehicle determined by the CPU 21 is the constant speed driving mode, the pitch angle θ0 in the stop mode is updated on the basis of the measured rear height HR in the driving mode by the CPU 21. The pitch angle θ1 in the driving mode is corrected on the basis of the pitch angle θ0, and the optical axis direction of the headlight 30 is adjusted. Irrespective of the presence or absence of a deviation in the optical axis direction of the headlight 30 of the vehicle, once the vehicle enters the constant speed driving mode before one trip is completed, the pitch angle θ0 in the stop mode is updated and the pitch angle θ0 in the driving mode is corrected. Even the optical axis direction of the headlight 30 is deviated at this time, therefore, it can be properly adjusted.

Sixth Embodiment

This embodiment is a modification of the control of adjusting the optical axis direction of the headlight 30 for dealing with not only the state where the vehicle is stopped riding on a block or the like but also a turning state of the vehicle.

Figure 25:
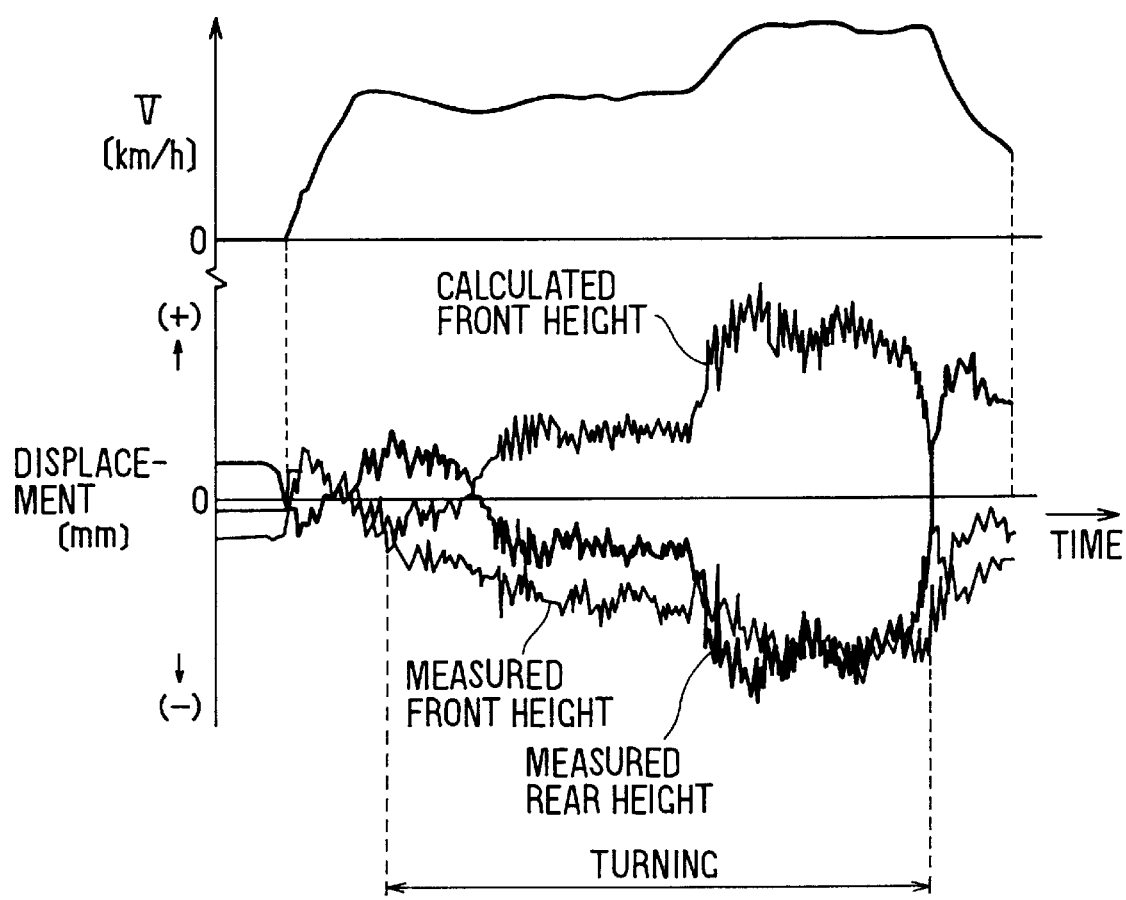
FIG. 25 is a timing diagram for explaining an inconvenience occurring during a turn of the vehicle without correction.

FIG. 25 is a timing diagram showing a transition of displacement [mm] in each of the rear height value measured by the height sensor 11 according to a change in the vehicle speed [km/h] from the stop mode of the vehicle, acceleration mode, turn (acceleration from some midpoint) mode, to the deceleration mode, the front height value calculated based on the measured rear height, and the measured front height for comparison, before the adjusting control of the embodiment is applied.

In FIG. 25, when the vehicle enters a turning state, the front height calculation value starts to be deviated from the measured front height. In the acceleration or deceleration mode or the constant speed driving mode when the vehicle travels straight ahead, the front height value and the pitch angle can be accurately calculated on the basis of the measured rear height. When the vehicle is turning, however, although the vehicle is in the constant speed driving mode and is not inclined in the longitudinal direction of the vehicle, the rear height value changes due to turning as a rotary motion of the vehicle about the longitudinal axis of the vehicle. A computation error therefore occurs in the inclination angle in the longitudinal direction of the vehicle until the turn of the vehicle is finished and, as a result, the optical axis direction of the headlight 30 is deviated for the following reason. For example, when the height sensor 11 is installed to the rear left wheel, the rear suspension is lowered during the right turn and the measured rear height is displaced to the minus side. Consequently, on the assumption that the front suspension is raised, the front height value is calculated. During a turn of the vehicle, however, although it depends on the acceleration or deceleration state, the actual front and measured rear heights enter the transition state in the almost same direction as understood from FIG. 25. For example, when a deviation of a predetermined threshold or larger occurs between the right and left wheel speeds, it is determined that the vehicle is turning. By correcting the front height calculation value on the basis of the measured rear height, the error can be eliminated.

Figure 26:
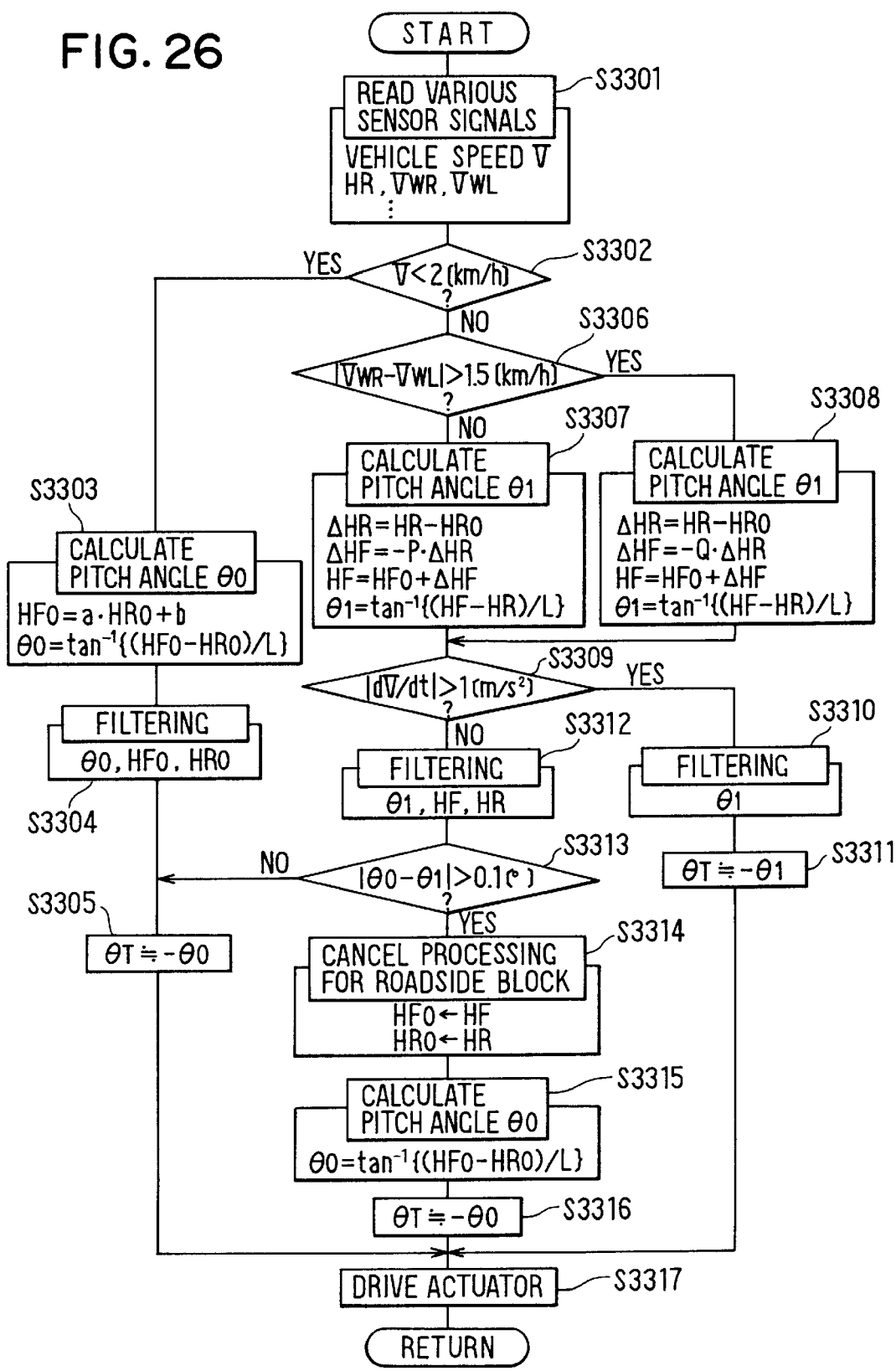
FIG. 26 is a flow diagram showing a procedure for dealing with not only the case where the vehicle is stopped riding on a block or the like but also a case where the vehicle is turning, by the CPU in a sixth embodiment.

A modification of a procedure for dealing with not only the case where the vehicle is stopped riding on a block or the like but also the case where the vehicle is turning, executed by the CPU 21 is shown in FIG. 26. The control routine is repeatedly executed every predetermined time by the CPU 21.

In FIG. 26, first at step S3301, various sensor signals such as the vehicle speed V from the vehicle speed sensor 12, the rear height value (the measured rear height) HR from the height sensor 11, the right-wheel speed VWR, the left-wheel speed VWL, and the like are read. When the vehicle is in the stop mode, the rear height value HR is changed to the rear height value (measured rear height) HR0 in the stop mode. The routine advances to step S3302 where it is determined whether or not the vehicle speed V read at step S3301 is lower than 2 [km/h]. When the determination condition at step S3302 is satisfied, that is, when the vehicle speed V is lower than 2 [km/h], the stop mode of the vehicle is determined. The routine proceeds to step S3303 where the pitch angle θ0 in the stop mode of the vehicle is calculated by the equations (1) on the basis of the measured rear height HR0 in the stop mode.

The routine advances to step S3304 where the pitch angle θ0 calculated at step S3303, the front height calculation value HF0 and the measured rear height HR0 in the stop mode are subjected to the filtering process such as moving averaging. At step S3305, the target optical axis direction adjustment angle θT (≐−θ1) at which no glare is given to an oncoming vehicle is calculated for the pitch angle θ0 in the stop mode, which is subjected to the filtering process at step S3304.

On the other hand, when the determination condition at step S3302 is not satisfied, that is, when the vehicle speed V is equal to or higher than 2 [km/h], it is determined that the vehicle is driving. The routine advances to step S3306 where it is determined whether or not the absolute value of a deviation between the right wheel speed VWR and the left wheel speed VWL read at step S3301 is larger than 1.5 [km/h]. When the determination condition at step S3306 is not satisfied, that is, when |VWR−VWL| is equal to or smaller than 1.5 [km/h], it is determined that the vehicle is driving straight ahead. The routine proceeds to step S3307 where the pitch angle θ1 in the straight-ahead drive mode of the vehicle is calculated by the equation 2 on the basis of the measured rear height HR at this time and the measured rear height HR0 in the stop mode.

On the other hand, when the determination condition at step S3306 is satisfied, that is, when |VWR−VWL| is larger than 1.5 [km/h], it is determined that the vehicle is turning. The routine advances to step S3308 where the pitch angle θ1 in the turn mode of the vehicle is calculated by the following equations 3 on the basis of the measured rear height HR at this time and the measured rear height HR0 in the stop mode. Q denotes a correction variable of about ±0.5 to 2 according to the acceleration or deceleration state of the vehicle, the right or left turn state, increase or decrease the number of occupants and luggage, and the suspension specifications.
[Equation 3]

$$\Delta HR = HR - HR0$$

$$\Delta HF = Q \cdot \Delta HR$$

$$HF = HF0 + HF$$

$$\theta 1 = \tan^{-1}\{(HF - HR)/L\} \quad (3)$$

After the pitch angle θ1 is calculated at step S3307 or S3308, the routine proceeds to step S3309 where it is determined whether or not |dv/dt| as an absolute value of the acceleration obtained by differentiating the vehicle speed V is larger than 1 [m/S$^2$]. When the determination condition at step S3309 is satisfied, that is, when |dV/dt| as an absolute value of the acceleration is larger than 1 [m/S$^2$], the acceleration or deceleration mode is determined. The routine advances to step S3310 where the pitch angle θ1 calculated at step S3307 or S3308 is subjected to the predetermined filtering process. The routine proceeds to step S311 where the target optical axis direction adjustment angle θT ($\doteq$−θ0) at which no glare is given to an oncoming vehicle is calculated for the pitch angle θ1 in the deceleration or acceleration mode which is subjected to the filtering process at step S3310.

On the other hand, when the determination condition at step S3309 is not satisfied, that is, when |dV/dt| as an absolute value of the acceleration is equal to or smaller than 1 [m/S$^2$], the constant speed driving mode is determined. The routine advances to step S3312 where the pitch angle θ1 calculated at step S3307 or S3308, the front height calculation value HF, and the measured rear height HR are subjected to the predetermined filtering process. The routine advances to step S3313 where it is determined whether or not the absolute value of the deviation between the pitch angle θ0 in the stop mode and the pitch angle θ1 in the constant speed driving mode is larger than 0.1 [°]. When the determination condition at step S3313 is not satisfied, that is, when |θ0−θ1| is equal to or smaller than 0.1 [°], it is determined that the present pitch angle θ1 does not have to be processed. The routine advances to step S3305 where the target optical axis direction adjustment angle θT ($\doteq$−θ0) at which no glare is given to an oncoming vehicle is calculated for the pitch angle θ0 in the stop mode which is subjected to the filtering process at step S3304.

On the other hand, when the determination condition at step S3313 is satisfied, that is, when |θ0−θ1| is larger than 0.1 [°], it is determined that the vehicle is stopped riding on a block or the like and that the pitch angle θ0 at that time is abnormal. The routine advances to step S3314 where the process for cancelling the state in which the vehicle is riding on a block or the like is performed. That is, the measured rear height HR in the constant speed driving mode and the front height calculation value HF are set to the measured rear height HR0 and the front height calculation value HF0 in the stop mode. After that, the routine advances to step S3315 where, in a manner similar to the equations 1, the pitch angle θ0 in the stop mode is updated and the pitch angle θ0 in the constant speed driving mode of the vehicle is calculated. Then, the routine shifts to step S3316 where the target optical axis direction adjustment angle θT ($\doteq$−θ0) at which no glare is given to an oncoming vehicle is calculated for the pitch angle θ0 in the constant speed driving mode calculated at step S3315.

The routine advances to step S3317 after the process at step S3305, S3311, or S3316, where the actuator 35 is driven on the basis of the calculated target optical axis direction adjustment angle θT, and the routine is finished. The control speed setting and the like with respect to the actuator 35 are omitted. Consequently, during the vehicle is turning, the displacement ΔHF in the front height calculation value is properly corrected, so that the pitch angle θ1 at that time does not become erroneous. Further, even if the vehicle is stopped riding on a block or the like and the pitch angle θ0 is abnormal, when the constant speed driving mode is once determined, the process for cancelling the state where the vehicle is stopped on the curb or the like is performed to thereby update the pitch angle θ0 without waiting for completion of one trip. After that, the optical axis direction of the headlight 30 can be properly adjusted.

Figure 27:
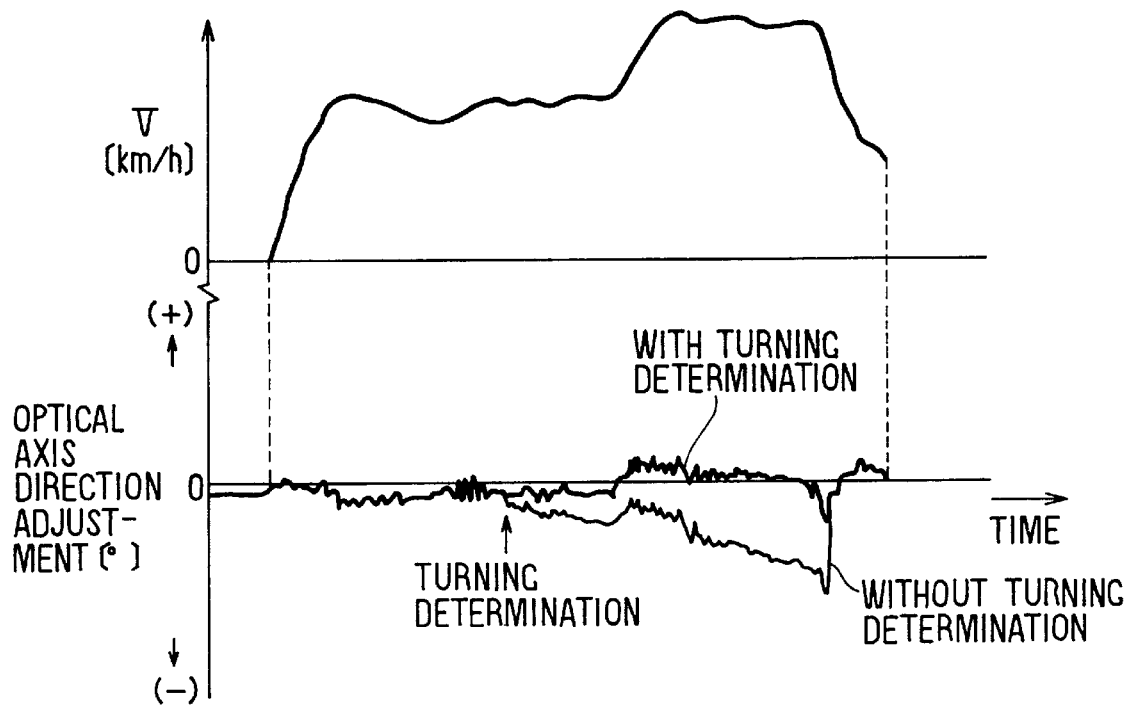
FIG. 27 is a timing diagram showing an optical axis direction adjustment amounts, one when the turn state is determined based on the flow diagram of FIG. 26 and the other when the turn state is not determined.

FIG. 27 is a timing diagram showing the optical axial direction adjustment amount [°] of the headlight 30 of the vehicle according to the change in the vehicle speed [km/h] when the correcting process during the turn of the vehicle is executed on the basis of the flow diagram of FIG. 26.

As shown in FIG. 27, in the case where the turn state is not determined, the optical axis direction of the headlight 30 of the vehicle is deviated due to an error in the displacement during a turn. On the contrary, when it is determined that the vehicle enters the turning state with the change in the vehicle speed [km/h], the above-mentioned determination condition is satisfied, and the displacement in the front height calculation value in the turning state is corrected, as shown by data in the case where the turn state is determined in FIG. 27, a deviation in the optical axis direction adjustment amount [°] of the headlight 30 of the vehicle is eliminated and the optical axis direction is returned to an almost initial position.

As described above, the pitch angle θ0 in the stop mode or the pitch angle θ1 in the driving mode corresponding to the inclination angle in the optical axis direction of the headlight 30 to the horizontal plane is calculated by the CPU 21 on the basis of the measured rear height HR0 in the stop mode or the rear height measured HR in the driving mode as an output of the single height sensor 11. When it is determined by the CPU 21 that the vehicle is in the turning state, the pitch angle θ1 corresponding to the inclination angle in the driving mode is corrected on the basis of the result of determination of the turn state of the vehicle at that time and the optical axis direction of the headlight 30 is adjusted by the CPU 21. When it is determined that the vehicle is in the turning state, the pitch angle θ1 in the driving mode is corrected in accordance with the turning state. Consequently, the deviation in the optical axis direction of the headlight 30 is adjusted.

Although the deviation between the right and left wheel speeds is used to determine the turn state of the vehicle in the foregoing embodiments, the invention is not limited to the deviation. Alternately, the steering angle of the steering wheel can be used.

Although the pitch angle is calculated after once obtaining the front height calculation value from the measured rear height in the equations 1 to 3 in the foregoing embodiments, when the front height data is not good, the pitch angle can also be directly converted from the measured rear height.

The present invention should not be limited to the disclosed embodiments and modifications but may be implemented in many other ways without departing from the spirit of the invention. For instance, the various features of the above embodiments and modifications may be combined into one embodiment in implementing the present invention.

What is claimed is:

1. A system for automatically adjusting optical axis direction of a headlight of a vehicle, comprising:
    a vehicle height sensor for sensing a displacement in a height of a vehicle;
    inclination angle calculating means for calculating an inclination angle of each of the optical axis direction of a headlight of the vehicle to the horizontal plane, on the basis of an output value of the vehicle height sensor;
    a vehicle speed sensor for sensing the speed of the vehicle;
    mode determining means for determining a control mode corresponding to a driving state from the vehicle speed and an acceleration calculated based on the vehicle speed;
    filter switching means for switching a filter which changes response of adjustment in the optical axis direction of the headlight in accordance with the control mode determined by the mode determining means; and
    optical axis direction adjusting means for adjusting the optical axis direction of the headlight on the basis of an angle obtained by performing filtering switched by the filter switching means to the inclination angle calculated by the inclination angle calculating means, wherein the mode determining means has a plurality of determination levels for determining a transition to an acceleration/deceleration state of the vehicle and, when the acceleration exceeds the determination level which is the highest among the plurality of determination levels and is set so as not to be reached in a normal driving state, continues a control mode corresponding to the acceleration/deceleration state of the vehicle unless a constant speed state of the vehicle continues for a predetermined period.

2. A system for automatically adjusting optical axis direction of a headlight of a vehicle according to claim 1, wherein the highest determination level is set so as to be reached by the acceleration in a driving state where at least one of a traction control and an antilock brake control is executed.

3. A system for automatically adjusting optical axis direction of a headlight of a vehicle, comprising:
    a single vehicle height sensor which is disposed in one of a front side and a rear side of a vehicle and senses a displacement in height of the vehicle;
    inclination angle calculating means for calculating an inclination angle in the optical axis direction of a headlight of the vehicle to the horizontal plane by using a prediction expression which is divided into a plurality of regions of vehicle postures having different inclinations in accordance with loading conditions, on the basis of an output of the vehicle height sensor; and
    optical axis direction adjusting means for adjusting the optical axis direction of the headlight on the basis of the inclination angle calculated by the inclination angle calculating means.

4. A system for automatically adjusting the optical axis direction of a headlight of a vehicle according to claim 3, wherein the inclination angle calculating means has a plurality of prediction expressions each of which is divided into a plurality of regions of vehicle postures in correspondence with outputs of sensors except for the vehicle height sensor arranged on the vehicle and selects one of the prediction expressions on the basis of the outputs of the sensors except for the vehicle height sensor.

5. A system for automatically adjusting optical axis direction of a headlight of a vehicle, comprising:
    a single vehicle height sensor which is disposed in one of a front side and a rear side of a vehicle and senses a displacement in height of the vehicle;
    storing means for preliminarily storing, as system error information, an error which occurs in association with installation of the vehicle height sensor and various errors caused by other factors of the vehicle;
    inclination angle calculating means for calculating an inclination angle in the optical axis direction of a headlight of the vehicle to a horizontal plane by using a prediction expression which is divided into a plurality of regions of vehicle postures having different inclinations in accordance with loading conditions, on the basis of an output of the vehicle height sensor and the system error information stored in the storing means; and
    optical axis direction adjusting means for adjusting the optical axis direction of the headlight on the basis of the inclination angle calculated by the inclination angle calculating means.

6. A system for automatically adjusting optical axis direction of a headlight of a vehicle, comprising:
    inclination angle calculating means for calculating an inclination angle in the optical axis direction of a headlight of a vehicle to the horizontal plane on the basis of an output of a single vehicle height sensor which is disposed in either a front part or a rear part of the vehicle and senses a displacement of height of the vehicle;
    driving mode determining means for determining a driving mode of the vehicle;
    reference angle updating means for updating a reference inclination angle in a stop mode of the vehicle on the basis of an output of the vehicle height sensor each time it is determined by the driving mode determining means that the vehicle is in a stable driving mode; and
    optical axis direction adjusting means for correcting the inclination angle calculated by the inclination angle calculating means on the basis of the reference angle by the reference angle updating means and adjusting the optical axis direction of the headlight.

7. A system for automatically adjusting optical axis direction of a headlight of a vehicle according to claim 6, wherein each time it is determined by the driving mode determining means that the vehicle is in the stable driving mode and the reference angle is abnormal, the reference angle updating means updates the reference angle on the basis of the output of the vehicle height sensor at that time.

8. A system for automatically adjusting optical axis direction of a headlight of a vehicle, comprising:

inclination angle calculating means for calculating an inclination angle in optical axis direction of a headlight of a vehicle to the horizontal plane on the basis of an output of a single vehicle height sensor which is disposed in either a front part or a rear part of the vehicle and senses a displacement of the height of the vehicle;

turning state determining means for determining a turning state of the vehicle; and optical axis direction adjusting means for correcting the inclination angle calculated by the inclination angle calculating means on the basis of a determination result of a turning state of the vehicle by the turning state determining means and adjusting the optical axis direction of the headlight.

9. A system for automatically adjusting optical axis direction of a headlight of a vehicle according to claim 8, wherein the inclination angle is calculated on the basis of the output of the vehicle height sensor.

* * * * *